United States Patent
Sakata et al.

(10) Patent No.: US 11,130,229 B2
(45) Date of Patent: Sep. 28, 2021

(54) LINK OPERATING DEVICE CONTROL DEVICE AND CONTROL METHOD

(71) Applicant: NTN CORPORATION, Osaka (JP)

(72) Inventors: Seigo Sakata, Iwata (JP); Yuuki Shimura, Iwata (JP); Hiroshi Isobe, Iwata (JP); Naoki Marui, Iwata (JP)

(73) Assignee: NTN CORPORATION, Osaka (JP)

( * ) Notice: Subject to any disclaimer, the term of this patent is extended or adjusted under 35 U.S.C. 154(b) by 225 days.

(21) Appl. No.: 16/545,626

(22) Filed: Aug. 20, 2019

(65) Prior Publication Data

US 2019/0366535 A1 Dec. 5, 2019

Related U.S. Application Data

(63) Continuation of application No. PCT/JP2018/006044, filed on Feb. 20, 2018.

(30) Foreign Application Priority Data

Feb. 24, 2017 (JP) .............................. JP2017-033520

(51) Int. Cl.
*B25J 9/10* (2006.01)
*B25J 9/16* (2006.01)
(Continued)

(52) U.S. Cl.
CPC ........... *B25J 9/106* (2013.01); *B23K 26/0884* (2013.01); *B25J 9/1664* (2013.01); *B25J 11/0075* (2013.01)

(58) Field of Classification Search
CPC ...... B25J 9/106; B25J 9/1664; B25J 11/0075; B25J 9/0096; B25J 9/0048; B25J 9/0018;
(Continued)

(56) References Cited

U.S. PATENT DOCUMENTS 6,330,837 B1 * 12/2001 Charles .................... B25J 11/00
74/490.06
7,472,622 B2 1/2009 Isobe et al.
(Continued)

FOREIGN PATENT DOCUMENTS

| JP | 2002-96170 | 4/2002 |
| JP | 2005-144627 | 6/2005 |

(Continued)

OTHER PUBLICATIONS

International Search Report dated Apr. 17, 2018 in corresponding International Patent Application No. PCT/JP2018/006044.
(Continued)

*Primary Examiner* — Jaime Figueroa

(57) ABSTRACT

An operation command generator includes: an area division unit configured to divide a line on a flat work surface of a target workpiece W into a straight area and a corner area, using a sharp boundary surface; a straight area operation command generation unit configured to generate a command for operating only the linear motion mechanism while keeping the posture of the parallel link mechanism fixed, in the straight area; and a corner area operation command generation unit configured to generate a command so that an acting point of the end effector passes on the boundary surface at a substantially constant speed by the linear motion mechanism and the parallel link mechanism performing coordinated operations in the corner area.

9 Claims, 12 Drawing Sheets

(51) Int. Cl.
  *B23K 26/08* (2014.01)
  *B25J 11/00* (2006.01)

(58) Field of Classification Search
  CPC ....... B25J 5/02; B25J 9/1623; B23K 26/0884; G05B 2219/40252; G05B 2219/50162; G05B 2219/40267; G05B 2219/40235; G05B 2219/49257; G05B 19/4093
  USPC .................................................. 700/245–264
  See application file for complete search history.

(56) References Cited

U.S. PATENT DOCUMENTS

| | | | | |
|---|---|---|---|---|
| 7,842,904 | B2* | 11/2010 | Nakata | B23K 9/125 |
| | | | | 219/137.71 |
| 8,897,916 | B2* | 11/2014 | Kawashima | B25J 3/04 |
| | | | | 700/245 |
| 9,821,454 | B2* | 11/2017 | Isobe | F16H 21/46 |
| 9,827,678 | B1* | 11/2017 | Gilbertson | B25J 18/025 |
| 10,065,310 | B2 | 9/2018 | Sakata et al. | |
| 10,737,817 | B2* | 8/2020 | Rogers | B65G 1/0435 |
| 2004/0149065 | A1* | 8/2004 | Moran | B25J 9/0078 |
| | | | | 74/490.04 |
| 2005/0159075 | A1 | 7/2005 | Isobe et al. | |
| 2010/0139436 | A1* | 6/2010 | Kawashima | A61B 34/70 |
| | | | | 74/490.01 |
| 2015/0088308 | A1* | 3/2015 | Isobe | B25J 13/087 |
| | | | | 700/245 |
| 2016/0256952 | A1 | 9/2016 | Isobe et al. | |
| 2016/0256998 | A1* | 9/2016 | Isobe | B05B 13/0431 |
| 2016/0361816 | A1 | 12/2016 | Sakata et al. | |
| 2017/0268640 | A1 | 9/2017 | Sakata et al. | |

FOREIGN PATENT DOCUMENTS

| | | |
|---|---|---|
| JP | 2015-155124 | 8/2015 |
| JP | 2015-188945 | 11/2015 |
| JP | 2016-107374 | 6/2016 |

OTHER PUBLICATIONS

English Translation by WIPO of the International Preliminary Report on Patentability dated Sep. 6, 2019 in corresponding International Patent Application No. PCT/JP2018/006044.
Notice of Reasons for Refusal dated Sep. 1, 2020, in corresponding Japanese Patent Application No. 2017-033520.
Extended European Search Report dated Nov. 23, 2020, in corresponding European Patent Application No. 18757063.5.

\* cited by examiner

PRIOR ART

LINK OPERATING DEVICE CONTROL DEVICE AND CONTROL METHOD

CROSS REFERENCE TO THE RELATED APPLICATION

This application is a continuation application, under 35 U.S.C. § 111(a) of international patent application No. PCT/JP2018/006044, filed Feb. 20, 2018, which claims priority to Japanese patent application No. 2017-033520, filed Feb. 24, 2017, the entire disclosure of which is herein incorporated by reference as a part of this application.

BACKGROUND OF THE INVENTION

Field of the Invention

The present invention relates to a control device and a control method for a link actuation device used in an apparatus, such as an industrial apparatus, that requires a precise and wide operating range.

Description of Related Art

Conventionally, various work devices have been suggested in which a linear motion device and a parallel link mechanism capable of changing the posture in three-dimensional directions are combined, and an end effector for performing laser processing, coating, welding or the like is attached to the parallel link mechanism, so as to enable conduction of complicated works (for example, Patent Documents 1 to 3 listed below).

RELATED DOCUMENT

Patent Document

[Patent Document 1] JP Laid-open Patent Publication No. 2005-144627
[Patent Document 2] JP Laid-open Patent Publication No. 2016-107374
[Patent Document 3] JP Laid-open Patent Publication No. 2015-155124

In the above parallel link mechanism, target workpieces to be worked by the end effector include not only workpieces having two-dimensional shapes but also workpieces having three-dimensional shapes. For example, in the case of causing the end effector to act on the entire periphery of the side surface of a three-dimensional workpiece, this can be conceivably achieved through coordinated operations of a turn table on which the workpiece is mounted and a linear motion mechanism provided so as to cause the end effector to be directed toward the side surface of the workpiece. However, if the size or the weight of the workpiece is great, it is difficult to rotate the workpiece. In this regard, by combining a parallel link mechanism and a linear motion mechanism, it becomes possible to cause the end effector to act on the entire periphery of the side surface of the workpiece without rotating the workpiece.

For example, as shown in FIG. 15, it is assumed that a parallel link mechanism 1 is mounted on an XY stage 34 in a suspended manner, and a target workpiece W having a rectangular parallelepiped is placed on a work table 39 which is a Z-axis stage. It is noted that the configuration of the link actuation device shown in FIG. 15 is basically the same as that described later in FIG. 2. In such a configuration, the following method may be generally used for causing the end effector 29 to act on the entire periphery of the side surface of the rectangular parallelepiped target workpiece W.

For the purpose of explaining the operation of the configuration shown in FIG. 15, FIG. 16 shows the positional relationship between the target workpiece and the parallel link mechanism when the configuration shown in FIG. 15 is seen from above. First, the XY stage 33 (FIG. 15) is moved to a position (i), and the parallel link mechanism 1 is moved to a position where the end effector 29 indicates point (a) on the side surface of the workpiece. Thereafter, the end effector 29 is activated, and at the same time, only the linear motion mechanism 31 (here, the Y axis of the XY stage 34) is moved to a position (ii) while the parallel link mechanism 1 is kept fixed. Then, after the movement to the position (ii) is completed, the end effector 29 is stopped. Secondly, the XY stage is moved to a position (iii), and the parallel link mechanism 1 is moved to a position where the end effector 29 indicates point (b) on the side surface of the workpiece. Thereafter, the end effector 29 is activated again, and at the same time, only the linear motion mechanism 31 (X-axis stage 33) is moved to a position (iv) while the parallel link mechanism 1 is kept fixed. After the movement to the position (iv) is completed, the end effector 29 is stopped. The same operation is repeated in the order of (v), (vi), (vii), (viii), whereby the end effector 29 can be caused to act on the entire periphery of the side surface of the rectangular parallelepiped target workpiece W.

In this method, since the end effector 29 is activated and stopped during a series of operations, a joint (discontinuity) by the end effector 29 occurs at the boundary part of the side surface. Accordingly, it is desired that, in the series of operations, at the time of movement at each corner, the parallel link mechanism 1 and the linear motion mechanism 31 are operated while the end effector 29 remains activated without being stopped. At this time, for example, at the corner of point (b), the XY stage 34 performs an arc interpolation movement from (ii) to (iii) with a central angle of 90° about point (b), and at the same time, the parallel link mechanism 1 is turned by 90° such that the end effector 29 indicates point (b). As a result, the end effector 29 continues acting at the point (b) during the time period in which the linear motion mechanism 31 and the parallel link mechanism 1 move from (ii) to (iii), and thus the end effector 29 acts excessively on the corner of point (b).

In any of the above methods, in the case of performing laser processing, coating by a dispenser or ink jetting, or welding, processing unevenness, coating unevenness, or thickness unevenness in welding may be caused.

SUMMARY OF THE INVENTION

In order to solve the above problem, an object of the present invention is to provide control device for a link actuation device and a control method for a link actuation device with which, in a work device in which a parallel link mechanism and a linear motion mechanism are combined, the end effector can perform working on the boundary surface having a sharp angle on the surface of a target workpiece while moving at a substantially constant speed at the boundary surface, and thus can perform working without generating unevenness on the boundary surface. Hereinafter, the summary of the present invention will be described using reference characters in the drawings showing embodiments.

A control device for a link actuation device according to the present invention is operable to control the link actuation device 41 in which a parallel link mechanism 1 and a linear motion mechanism 31 are combined and which performs working by causing an end effector 29 to continuously act along a line L extending over a boundary surface B at a corner on a flat work surface S of a target workpiece W. The parallel link mechanism 1 has a structure in which a distal-end-side link hub 3, to which the end effector 29 is mounted, is connected to a proximal-end-side link hub 2 via three or more link mechanisms 4 such that a posture of the distal-end-side link hub 3 is changeable relative to the proximal-end-side link hub 2, and the parallel link mechanism 1 includes a plurality of actuators 53 to 55 for changing the posture of the distal-end-side link hub 3.

The linear motion mechanism 31 has a function of linearly moving in two-axis directions or three-axis directions orthogonal to each other by being driven by actuators 35 to 37, and the linear motion mechanism 31 is provided so as to move the proximal-end-side link hub 2 of the parallel link mechanism 1 or move the target workpiece W. The control device 61 includes: a line storage 64 configured to store the line L as line segment data; an operation command generator 65 configured to generate an operation command for operating the parallel link mechanism 1 and the linear motion mechanism 31, on the basis of the stored line L; and a controller 66 configured to control the actuators 35 to 37 of the linear motion mechanism 31 and the parallel link mechanism 1 in accordance with the generated operation command.

The operation command generator 65 includes: an area division unit 67 configured to divide the line L on the flat work surface S into a straight area LS and a corner area LC, using the boundary surface B as a reference, in accordance with a predetermined rule; a straight area operation command generation unit 68 configured to generate a command for operating only the linear motion mechanism 31 while keeping the posture of the parallel link mechanism 1 fixed, in the straight area LS; and a corner area operation command generation unit 69 configured to generate a command so that an acting point P of the end effector 29 passes on the boundary surface B at a substantially constant speed by the linear motion mechanism 31 and the parallel link mechanism 1 performing coordinated operations in the corner area LC.

In the control device configured as described above, in operation in which the end effector 29 is caused to continuously act along the line L extending over the boundary surface B which is located at a corner on the flat work surface S of the target workpiece W and thus has a sharp angle, the area division unit 67 divides the line L into the straight area LS and the corner area LC.

In the straight area LS, only the linear motion mechanism 31 is operated while the parallel link mechanism 1 is kept fixed in a desired posture. In the corner area LC, the linear motion mechanism 31 and the parallel link mechanism 1 are controlled so as to perform coordinated operations so that the acting point P of the end effector 29 passes on the boundary surface B at a substantially constant speed.

Thus, in the operation in which the end effector 29 continuously acts on the boundary surface B having a sharp angle on the flat work surface S, the acting point P of the end effector 29 can move at a substantially constant speed, whereby unevenness in working by the end effector 29 can be eliminated. In the case where, as the end effector 29, a laser, a dispenser, an ink jet device, a welding device, or the like is attached to the link to perform working, it is possible to eliminate unevenness of laser processing, unevenness of coating by the dispenser or the ink jet device, or unevenness of welding by the welding device.

Since division into the straight area LS and the corner area LC is performed and coordinated operations are performed in only the corner area LC, a command for performing the coordinated operations can be generated efficiently and in a short time. In the straight area LS, of the parallel link mechanism 1 and the linear motion mechanism 31, only the linear motion mechanism 31 is operated, and therefore, it is possible to perform operation at high speed. Also, since the posture of the end effector 29 is not changed, there is an advantage in terms of working quality.

A specific example of a method for performing the coordinated operations is as follows. First, a path from a start point A to an end point E of the corner area LC is divided into a plurality of sections by passing points F. The position of the linear motion mechanism 31 and the posture of the parallel link mechanism 1 in each section are set so that the angle at which the end effector 29 acts will change smoothly. At this time, the change in the angle at which the end effector 29 acts is set to be small enough that the quality after the end effector 29 acts is not influenced. The movement amounts (X, Y, Z) of the linear motion mechanism 31 (XYZ stage) in each divided section, and the movement amounts ($\beta1$, $\beta2$, $\beta3$) of the actuators 53 to 55 composing the parallel link mechanism 1, are calculated.

Secondly, the movement speeds of the actuators 35 to 37, 53 to 55 in each section are calculated from a movement period in the section determined by a specified target movement speed (speed of tracing the side surface of the workpiece) and the distance of the section, and the movement amounts of the actuators 35 to 37, 53 to 55 in the section. By continuously positioning the actuators 35 to 37, 53 to 55 without acceleration or deceleration in each divided section, the end effector 29 moves at a substantially constant speed from the start point A to the end point E of the corner area LC. The "substantially constant speed" is, in other words, "approximately constant speed", and means that the speed is hardly changed so that the speed can be regarded as constant speed in terms of working by the end effector 29. At a joint between the corner area LC and the straight area LS, continuous operation is similarly performed without acceleration or deceleration. Thus, in the case of performing laser processing, coating by a dispenser or ink jet, or welding, it is possible to eliminate processing unevenness, coating unevenness, or thickness unevenness in welding on the boundary surface B.

The above specific method for coordinated operations may be implemented as follows. For example, the corner area operation command generation unit 69 divides a path from a start point A to an end point E of the corner area LC into a specified number of sections by passing points F; calculates movement amounts X, Y, Z of the linear motion mechanism 31 in each divided section, and movement amounts $\beta1$, $\beta2$, $\beta3$ of the actuators 53 to 55 composing the parallel link mechanism 1; calculates movement speeds of the actuators 35 to 37, 53 to 55 in each section, on the basis of a movement period in each section determined by the specified target movement speed and the distance of the section, and the movement amounts $\beta1$, $\beta2$, $\beta3$, X, Y, Z of the actuators 53 to 55, 35 to 37 in the section; and generates a command for continuously positioning each actuator 35 to 37, 53 to 55 without acceleration or deceleration, in each divided section.

The area division unit 67 may calculate a size of the corner area LC, on the basis of a speed limit of the linear motion mechanism 31 and a movement speed of the linear motion mechanism 31 calculated from each divided passing point F and the specified target movement speed in the corner area operation command generation unit 69. Thus, it is possible to calculate an appropriate size of the corner area LC that allows desired coordinated operations.

The area division unit 67 may include a table TB indicating a relationship between a size of the corner area LC and a specified target movement speed, and may calculate the size of the corner area LC from the target movement speed by using the table TB. Such a configuration also makes it possible to calculate an appropriate size of the corner area LC that allows desired coordinated operations.

The operation command generator 65 may perform the generation of the operation command based on the line segment data of the line L, at the time of operation of the link actuation device 41, e.g., immediately before operation in each section, or simultaneously with the operation. Alternatively, the operation command generator 65 may calculate settings (e.g., operation commands) for all the sections in the corner area LC before the link actuation device 41 actually operates, and may store the settings into an operation command storage 70, and the controller 66 may perform control by reading the settings corresponding to the sections from the operation command storage 70, at a time of operating the link actuation device 41. In this case, the operation command generator 65 and the controller 66 may be formed by physically separated computers or the like, and the generated operation commands may be stored, online or offline, into the operation command storage 70 provided on the controller 66 side.

The flat work surface S to be worked by the end effector 29 may be an outer peripheral surface of a rectangular parallelepiped, or may be an inner peripheral surface thereof. In the case where such an outer peripheral surface or an inner peripheral surface of a rectangular parallelepiped is the flat work surface S, the effect of the present invention that working can be performed without unevenness is more effectively exerted.

A control method for a link actuation device according to the present invention is operable to control the link actuation device 41 configured as described above, the method including: dividing the line L on the flat work surface S into a straight area LS and a corner area LC, using the boundary surface B as a reference, in accordance with a predetermined rule; operating only the linear motion mechanism 31 while keeping the posture of the parallel link mechanism 1 fixed, in the straight area LS; and performing operation so that an acting point P of the end effector 29 passes on the boundary surface B at a substantially constant speed by the linear motion mechanism 31 and the parallel link mechanism 1 performing coordinated operations in the corner area LC. Desirably, the above control method may further include: storing the line L as line segment data; generating an operation command for operating the parallel link mechanism 1 and the linear motion mechanism 31, on the basis of the stored line and controlling the actuators 35 to 37 of the linear motion mechanism 31 and the parallel link mechanism 1 in accordance with the generated operation command.

In the above control method, as in the control device of the present invention described above, the end effector 29 can perform working on the boundary surface B having a sharp angle on the surface of the target workpiece, while moving at a substantially constant speed at the boundary surface B, and thus can perform working without generating unevenness on the boundary surface B.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
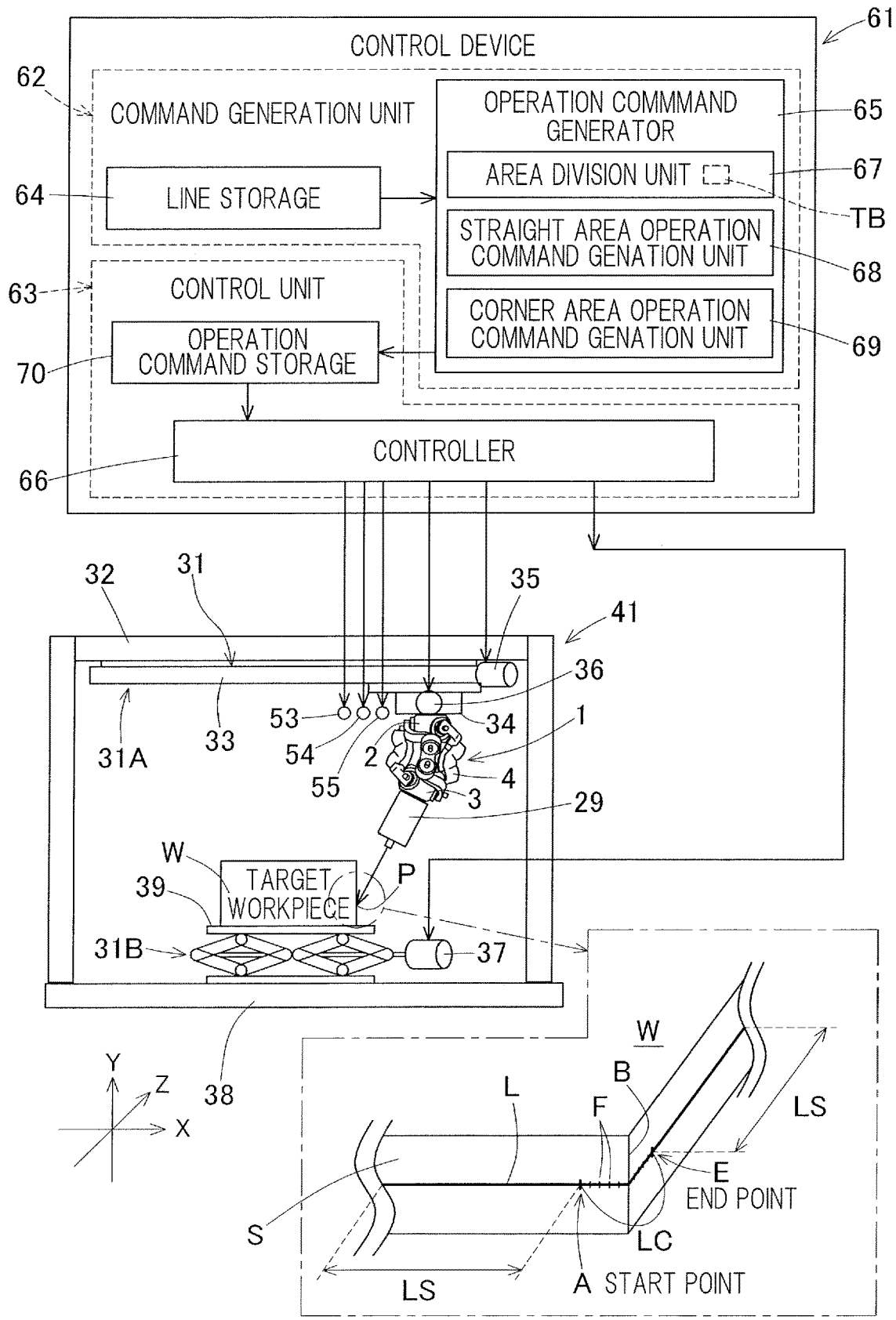
FIG. 1 illustrates the conceptual configuration of a control device for a link actuation device according to an embodiment of the present invention.

An embodiment of the present invention will be described with reference to the drawings. This control device 61 for a link actuation device is operable to control a link actuation device 41 in which a parallel link mechanism 1 and a linear motion mechanism 31 are combined, and is applied to the case of performing working while causing the end effector 29 to continuously act along a line L extending over a boundary surface B at a corner on a flat work surface of a target workpiece W.

<Configuration of Link Actuation Device 41>

Figure 2:
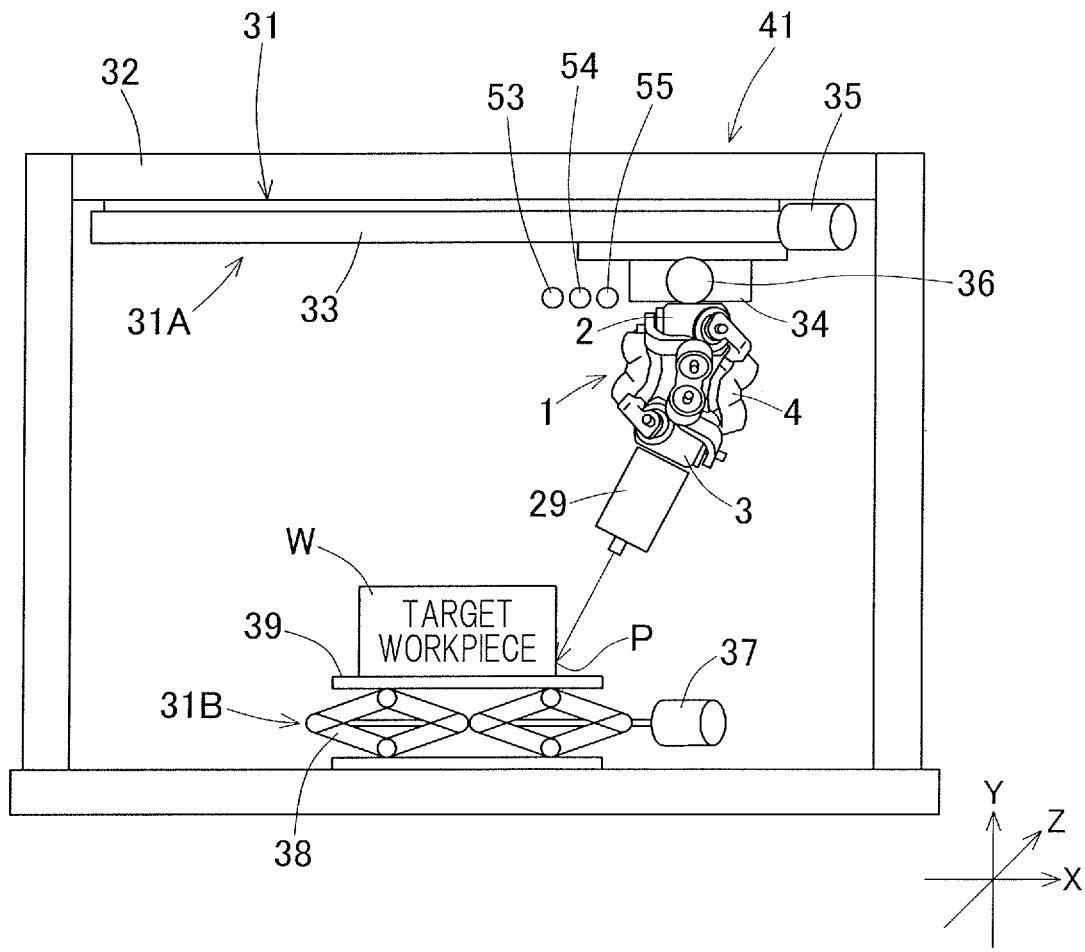
FIG. 2 is a front view of the link actuation device to be controlled by the control device.
Figure 3:
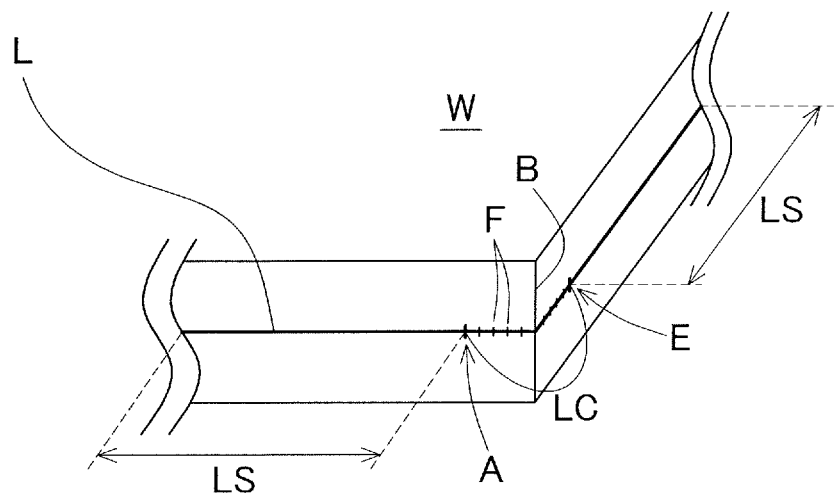
FIG. 3 is a partial perspective view showing areas of a target workpiece.

As shown in FIG. 2, in the parallel link mechanism 1, a distal-end-side link hub 3 to which the end effector 29 is mounted is connected to a proximal-end-side link hub 2 via three link mechanisms 4 such that the posture of the distal-end-side link hub 3 is changeable relative to the proximal-end-side link hub 2, and a plurality of actuators 53, 54, 55 are provided which act onto the link mechanism 4 so as to change the posture of the distal-end-side link hub 3.

The linear motion mechanism 31 has a function of linearly moving the target workpiece W in three-axis directions orthogonal to each other. In the present embodiment, the linear motion mechanism 31 includes: a link-side linear motion mechanism portion 31A for moving the target workpiece W in two-axis directions along X axis and Y axis; and a workpiece-side linear motion mechanism portion 31B for moving the target workpiece W in the Z-axis direction. The X axis, Y axis, and Z axis are along the right-left direction, the front-rear direction, and the up-down direction, respectively, and are orthogonal to each other.

The link-side linear motion mechanism portion 31A includes an X stage 33 provided at a top portion of a mount 32 so as to be movable in the X-axis direction, and an XY stage 34 provided to the X stage 33 so as to be movable in the Y-axis direction. The proximal-end-side link hub 2 located at the upper end in the parallel link mechanism 1 is connected to the XY stage 34, and the parallel link mechanism 1 is mounted so as to be directed downward. The X stage 33 and the XY stage 34 are driven to move forward/backward relative to the mount 32 and the X stage 33, by X-axis and Y-axis actuators 35, 36 such as motors, respectively.

The workpiece-side linear motion mechanism portion 31B is provided below the area where the parallel link mechanism 1 operates, and includes a work table 39 which is driven to be lifted/lowered by a Z-axis actuator 37 such as a motor via a lifting/lowering mechanism 38. The target workpiece W is to be placed on the work table 39.

The end effector 29 is operable to perform working on the target workpiece W, in, for example, a contactless manner, and is a laser for laser processing, a dispenser for coating, an ink-jet nozzle, a welding torch, or the like.

A specific example of the parallel link mechanism 1 will be described with reference to FIG. 7 to FIG. 11. FIG. 9A and FIG. 9B are front views respectively showing different states of the parallel link mechanism 1. The parallel link mechanism 1 is formed by connecting the distal-end-side link hub 3 to the proximal-end-side link hub 2 via the three link mechanisms 4 such that the posture of the distal-end-side link hub 3 is changeable relative to the proximal-end-side link hub 2. FIG. 9A and FIG. 9B show only one link mechanism 4.

Figure 7:
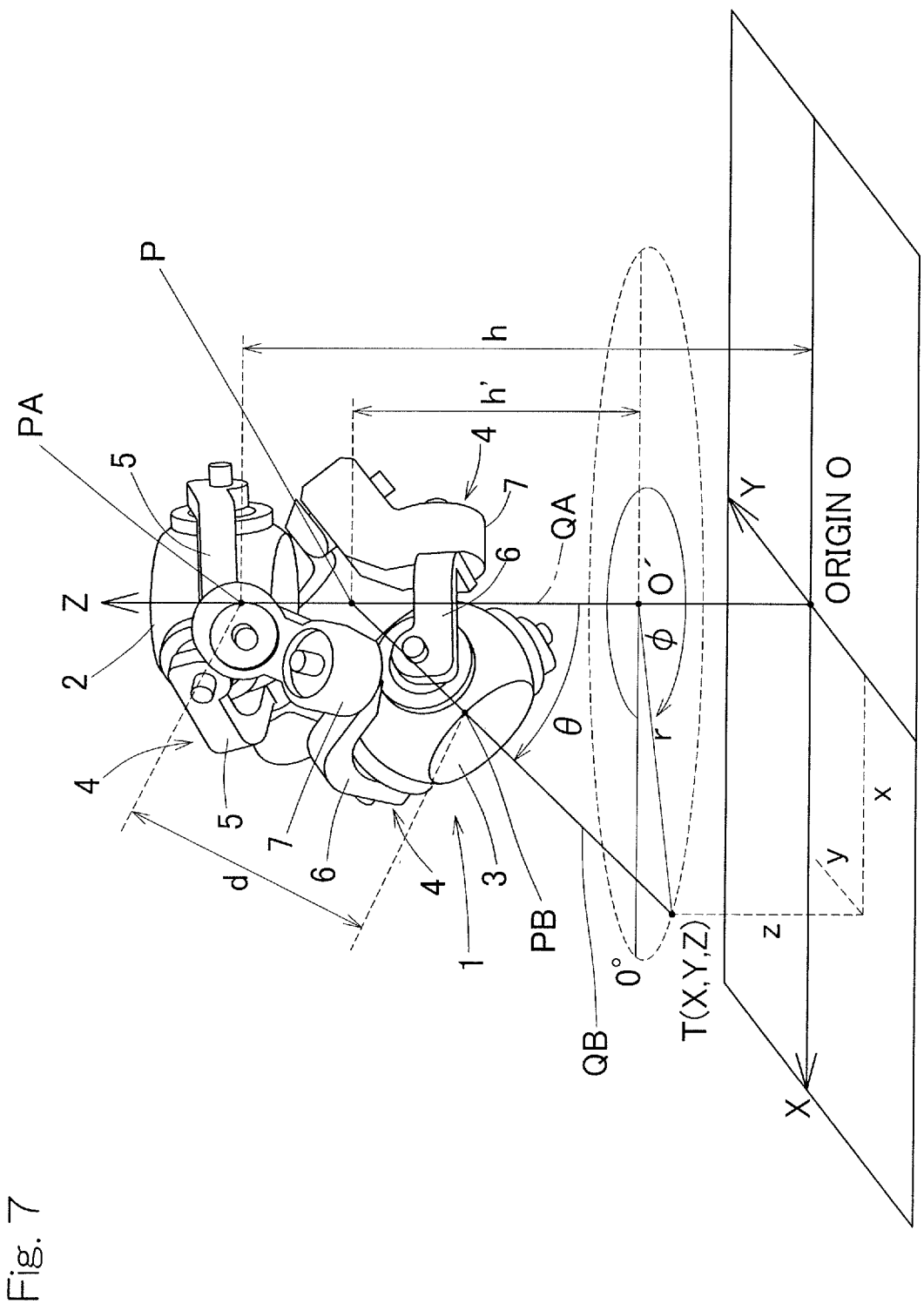
FIG. 7 is a perspective view of a parallel link mechanism of the link actuation device.

FIG. 7 is a perspective view showing the parallel link mechanism 1 three-dimensionally. Each of the three link mechanisms 4 includes a proximal-end-side end link member 5, a distal-end-side end link member 6, and a center link member 7, and thus, forms a trinodal chain link mechanism composed of four revolute pairs. The proximal-end-side and distal-end-side end link members 5, 6 form an L shape, and have respective proximal ends rotatably connected to the proximal-end-side link hub 2 and the distal-end-side link hub 3. The center link member 7 has one end to which the distal end of the proximal-end-side end link member 5 is rotatably connected, and the other end to which the distal end of the distal-end-side end link member 6 is rotatably connected.

The proximal-end-side and distal-end-side end link members 5, 6 have spherical link structures, and spherical link centers PA, PB (FIG. 9A) of the three link mechanisms 4 coincide with each other. In addition, a distance d between the spherical link centers PA, PB is also the same among the three link mechanisms 4. The center axes of the revolute pairs between the end link members 5, 6 and the center link member 7 may have a certain crossing angle γ, or may be parallel.

Figure 10:
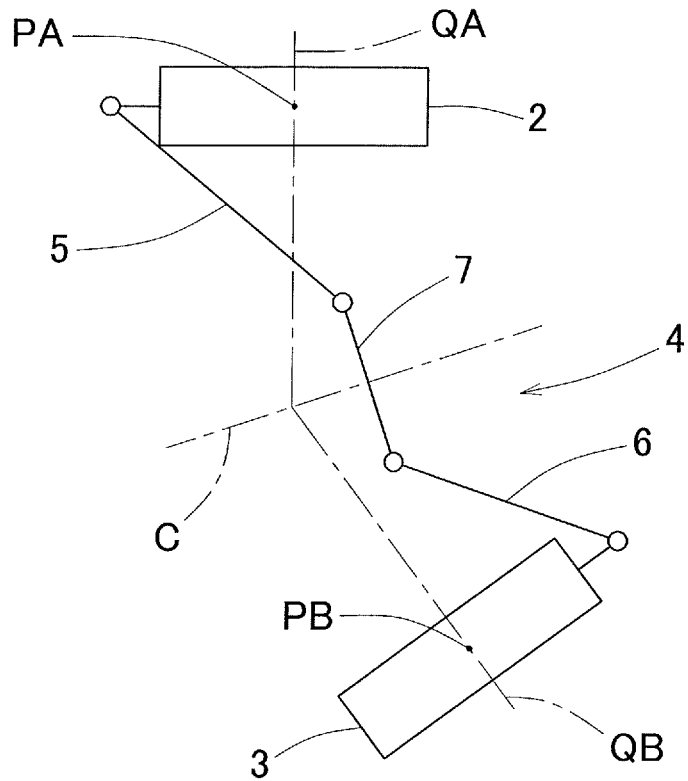
FIG. 10 shows a straight-line model of the parallel link mechanism.

That is, the three link mechanisms 4 have a geometrically identical shape. The geometrically identical shape means that a geometric model representing the link members 5, 6, 7 by straight lines, i.e., a model represented by the revolute pairs and straight lines connecting the revolute pairs, has such a shape that the proximal-end-side part and the distal-end-side part with respect to the center of the center link member 7 are symmetric. FIG. 10 is a diagram representing one link mechanism 4 by straight lines.

Each link mechanism 4 of the present embodiment is a rotationally symmetric type, so that the positional relationship between a proximal side region composed of the proximal-end-side link hub 2 and the proximal-end-side end link member 5, and a distal side region composed of the distal-end-side link hub 3 and the distal-end-side end link member 6, is rotationally symmetric with respect to a center line C of the center link member 7. FIG. 9A shows a state in which a center axis QA of the proximal-end-side link hub 2 and a center axis QB of the distal-end-side link hub 3 are on the same line, and FIG. 9B shows a state in which the center axis QB of the distal-end-side link hub 3 has a predetermined operating angle relative to the center axis QA of the proximal-end-side link hub 2. Even when the posture of each link mechanism 4 is changed, the distance d between the proximal-end-side and distal-end-side spherical link centers PA, PB does not change.

The proximal-end-side link hub 2, the distal-end-side link hub 3, and the three link mechanisms 4 cooperate together to form a mechanism having two degrees of freedom that allows the distal-end-side link hub 3 to move in orthogonal two-axis directions relative to the proximal-end-side link hub 2. In other words, this mechanism is operable to allow the posture of the distal-end-side link hub 3 to be changed relative to the proximal-end-side link hub 2 at two degrees of freedom in rotation. In this mechanism having two degrees of freedom, the distal-end-side link hub 3 is changed in its posture relative to the proximal-end-side link hub 2 about an intersection P among the center axis QA of the proximal-end-side link hub 2, the center axis QB of the distal-end-side link hub 3, and the center line C of the center link member 7.

In this mechanism having two degrees of freedom, the movable range of the distal-end-side link hub 3 relative to the proximal-end-side link hub 2 can be set to be wide, in spite of its compact size. For example, the maximum value (maximum bend angle) of a bend angle θ (FIG. 7) between the center axis QA of the proximal-end-side link hub 2 and the center axis QB of the distal-end-side link hub 3 can be about ±90°. In addition, a turning angle φ of the distal-end-side link hub 3 relative to the proximal-end-side link hub 2 can be set within a range of 0° to 360°. The bend angle θ is a vertical angle at which the center axis QB of the distal-end-side link hub 3 is tilted relative to the center axis QA of the proximal-end-side link hub 2. The turning angle φ is a horizontal angle at which the center axis QB of the distalend-side link hub 3 is tilted relative to the center axis QA of the proximal-end-side link hub 2.

This parallel link mechanism 1 can be configured such that shaft members 13 (FIG. 8) of the end link members 5, 6 of each link mechanism 4 are equal in angle and length, the proximal-end-side end link member 5 and the distal-end-side end link member 6 are equal in geometric shape, and the proximal end side and the distal end side of the center link member 7 have equal shapes. At this time, if the angular positional relationship between the center link member 7 and the end link members 5, 6 is the same between the proximal end side and the distal end side with respect to the symmetry plane of the center link member 7, due to the geometric symmetry, the proximal side region composed of the proximal-end-side link hub 2 and the proximal-end-side end link member 5, and the distal side region composed of the distal-end-side link hub 3 and the distal-end-side end link member 6, move in the same manner. For example, in the case where rotation shafts are provided in the proximal-end-side and distal-end-side link hubs 2, 3 coaxially with their respective center axes QA, QB and rotation is transmitted from the proximal end side to the distal end side, a constant velocity universal joint is obtained in which the proximal end side and the distal end side are rotated by the same rotation angle at equal speeds. The symmetry plane of the center link member 7 in this equal-speed rotation is referred to as constant velocity bisecting plane.

Therefore, by arranging, on the circumference, a plurality of link mechanisms 4 sharing the proximal-end-side link hub 2 and the distal-end-side link hub 3 and having the same geometric shape, as positions that allow the plurality of link mechanisms 4 to move compatibly with each other, the center link members 7 are limited to move on only their respective constant velocity bisecting planes. Thus, even when the proximal end side and the distal end side have any operating angles, the proximal end side and the distal end side rotate at equal speeds.

The proximal-end-side link hub 2 and the distal-end-side link hub 3 each have a through hole 10 (FIG. 11) formed along the axial direction, at the center part, and have a doughnut shape whose outer shape is spherical. The center axes of the through holes 10 coincide with the respective center axes QA, QB of the link hubs 2, 3. At regular-interval positions along the circumferential direction on the outer circumferential surfaces of the proximal-end-side link hub 2 and the distal-end-side link hub 3, the proximal-end-side end link members 5 and the distal-end-side end link members 6 are rotatably connected thereto, respectively.

Figure 11:
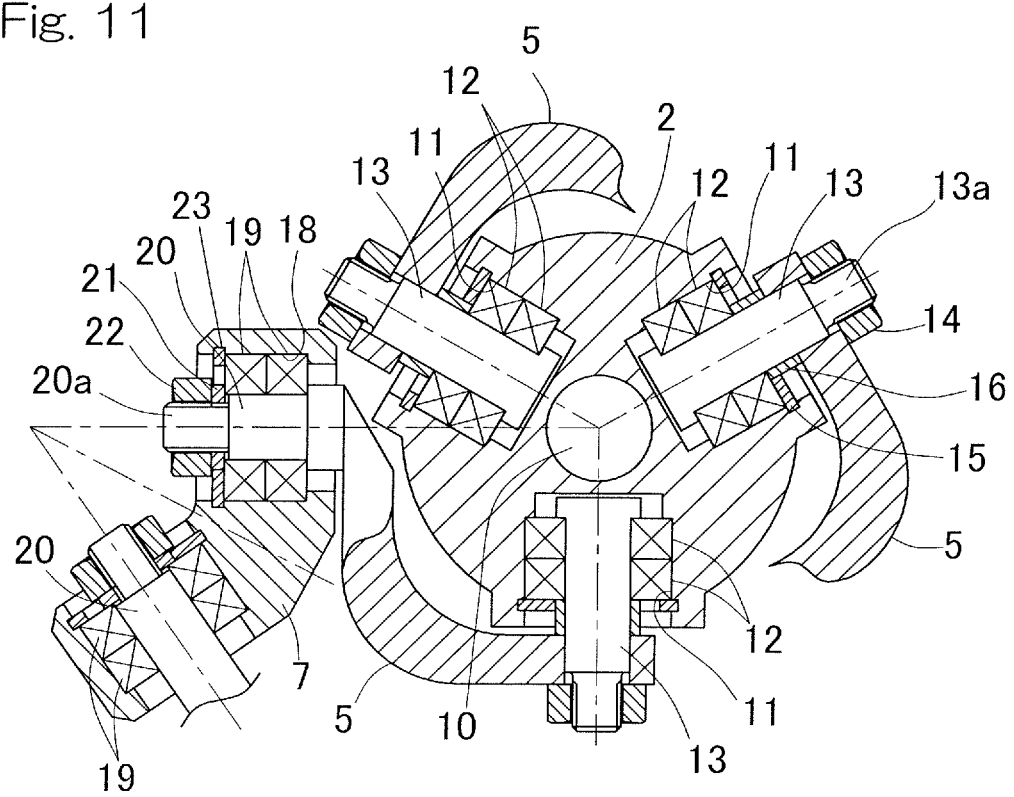
FIG. 11 is an enlarged sectional view of a part of the parallel link mechanism.

FIG. 11 is a sectional view showing a revolute pair between the proximal-end-side link hub 2 and the proximal-end-side end link member 5, and a revolute pair between the proximal-end-side end link member 5 and the center link member 7. The proximal-end-side link hub 2 has, at three locations along the circumferential direction, communication holes 11 which extend in the radial direction and through which the axial-direction through hole 10 and the outer circumferential side communicate with each other. Each shaft member 13 is rotatably supported by two bearings 12 provided in the communication hole 11. An outer end of the shaft member 13 protrudes from the proximal-end-side link hub 2, and has a protruding screw portion 13a to which the proximal-end-side end link member 5 is joined and fastened by a nut 14 being tightened.

Each bearing 12 is a rolling bearing such as a deep groove ball bearing, for example, and has an outer ring fitted to the inner circumference of the communication hole 11, and an inner ring (not shown) fitted to the outer circumference of the shaft member 13. The outer ring is prevented from coming off, by a retaining ring 15. A spacer 16 is interposed between the inner ring and the proximal-end-side end link member 5. The tightening force of the nut 14 is transferred to the inner ring via the proximal-end-side end link member 5 and the spacer 16, so as to apply a predetermined preload to the bearings 12.

In the revolute pair between the proximal-end-side end link member 5 and the center link member 7, two bearings 19 are provided in each of communication holes 18 formed at both ends of the center link member 7, and a shaft portion 20 defined at the distal end of the proximal-end-side end link member 5 is rotatably supported by the bearings 19. The bearings 19 are fixed via a spacer 21 by a nut 22 being tightened.

Each bearing 19 is a rolling bearing such as a deep groove ball bearing, for example, and has an outer ring (not shown) fitted to the inner circumference of the communication hole 18, and an inner ring (not shown) fitted to the outer circumference of the shaft portion 20. The outer ring is prevented from coming off, by a retaining ring 23. A tightening force of the nut 22 screwed to a tip end screw portion 20a of the shaft portion 20 is transferred to the inner ring via the spacer 21, so as to apply a predetermined preload to the bearings 19.

Thus, the revolute pair between the proximal-end-side link hub 2 and the proximal-end-side end link member 5, and the revolute pair between the proximal-end-side end link member 5 and the center link member 7, have been described above. The same configuration applies also to the revolute pair between the distal-end-side link hub 3 and the distal-end-side end link member 6, and the revolute pair between the distal-end-side end link member 6 and the center link member 7 (not shown).

As described above, the bearings 12, 19 are provided to the four revolute pairs in each link mechanism 4, i.e., the revolute pair between the proximal-end-side link hub 2 and the proximal-end-side end link member 5, the revolute pair between the distal-end-side link hub 3 and the distal-end-side end link member 6, the revolute pair between the proximal-end-side end link member 5 and the center link member 7, and the revolute pair between the distal-end-side end link member 6 and the center link member 7. Thus, frictional resistance in each revolute pair is reduced, whereby rotational resistance can be reduced, so that smooth power transmission can be ensured, and also, durability can be improved.

Figure 8:
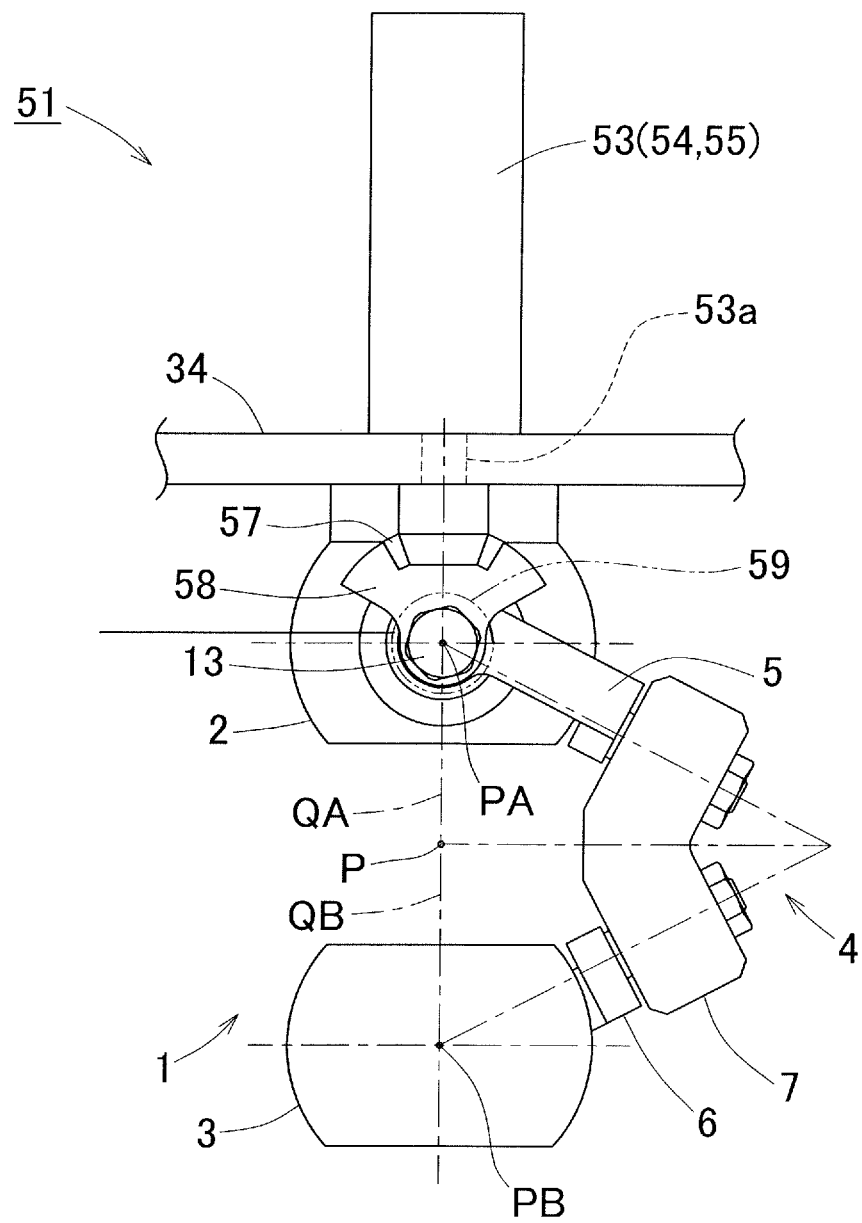
FIG. 8 is a front view showing a partial link mechanism of the parallel link mechanism.
Figure 9A:
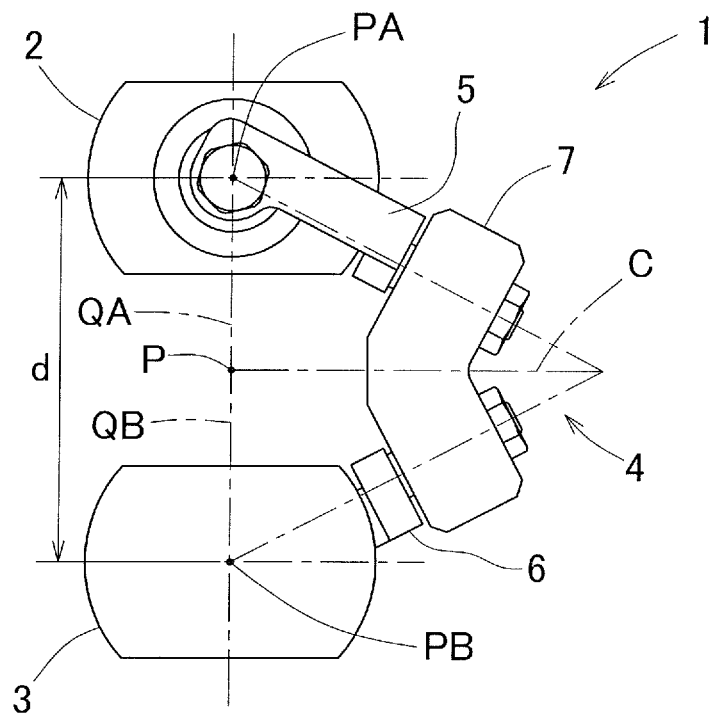
FIG. 9A illustrates operation of the parallel link mechanism, and shows the link mechanism before the posture thereof is changed.
Figure 9B:
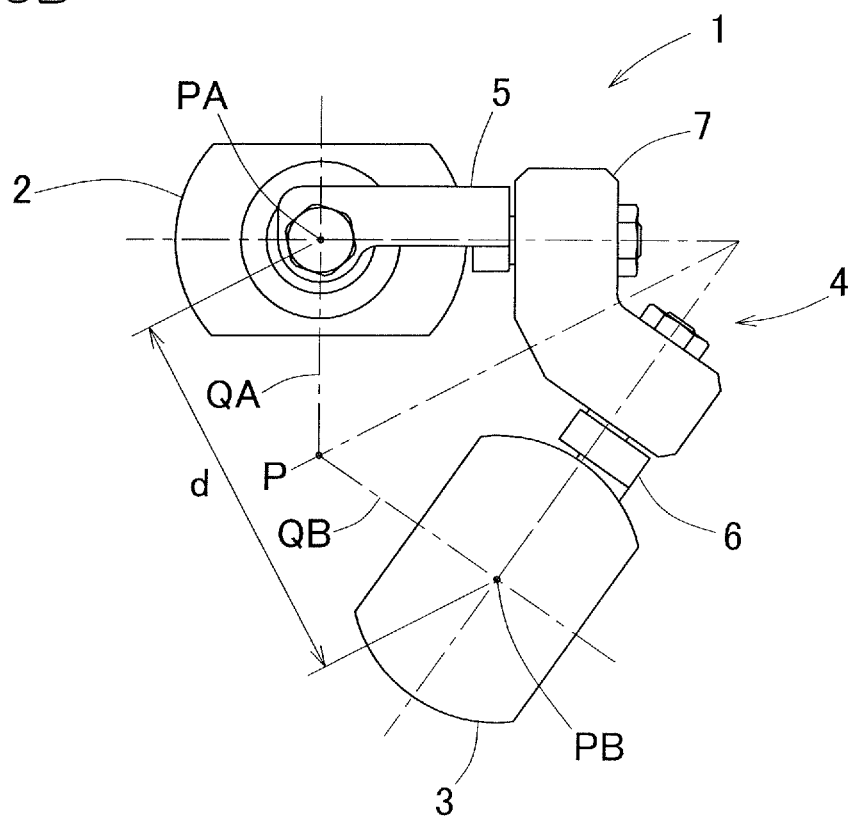
FIG. 9B illustrates the operation of the parallel link mechanism, and shows the link mechanism after the posture thereof is changed.

In the parallel link mechanism 1 shown in FIG. 8, the proximal-end-side link hub 2 is fixed to the lower surface of the XY stage 34, and the distal-end-side link hub 3 is provided in a suspended state. The actuator 53, which is formed from a motor or another rotary actuator, is provided on the upper surface of the XY stage 34. In FIG. 8, one link mechanism 4 is shown, but also for the other two link mechanisms 4, the actuators 54, 55 are provided in the same manner as described above, and are connected to the respective link mechanisms 4 in the same manner as described below. An output shaft 53a of the actuator 53 penetrates the XY stage 34 so as to protrude downward, and a bevel gear 57 attached to the output shaft 53a and a sector-shaped bevel gear 58 attached to the shaft member 13 of the proximal-end-side link hub 2 are engaged with each other.

When the actuator 53 is rotated, the rotation is transferred to the shaft member 13 via the pair of bevel gears 57, 58, so that the angle of the proximal-end-side end link member 5 relative to the proximal-end-side link hub 2 is changed. Through control of the operation amount of each actuator 53, the angle of the proximal-end-side end link member 5 is adjusted for the individual link mechanism 4, whereby the posture (hereinafter, referred to as "distal end posture") of the distal-end-side link hub 3 relative to the proximal-end-side link hub 2 is determined. The operation of each actuator 53 to 55 is controlled by the control device 61 shown in FIG. 1.

<Configuration of Control Device 61>

As shown in FIG. 1, the control device 61 includes: a command generation unit 62 for generating an operation command on the basis of line segment data of the line L on the flat work surface S of the target workpiece W; and a control unit 63 for controlling the link actuation device 41 in accordance with the generated operation command. The command generation unit 62 and the control unit 63 may be provided in one computer or the like so as to be conceptually discriminated from each other, or may be provided in separate devices such as computers different from each other and may be connected to each other online or configured to be able to pass and receive data via a storage medium or the like, offline. In the case where the command generation unit 62 and the control unit 63 are separate devices, they may be provided at remote locations separated from each other.

The control unit 63 includes a controller 66 and an operation command storage 70. The controller 66 is operable to control the actuators 53, 54, 55 of the parallel link mechanism 1 and the actuators 35, 36, 37 of the linear motion mechanism 31 in accordance with the generated operation command, and is, as it were, a numerical control device. The controller 66 performs position control and speed control for the actuators 53, 54, 55 of the parallel link mechanism 1 and the actuators 35, 36, 37 of the linear motion mechanism 31, in a point-to-point manner, for example. The operation command storage 70 is operable to store an operation command to be executed by the controller 66 and to store an operation command generated by the command generation unit 62. It is noted that, in the case where the command generation unit 62 and the control unit 63 are provided separately from each other, such a storage may be provided in each of both units so that operation commands can be transferred therebetween.

The command generation unit 62 includes a line storage 64 and an operation command generator 65.

The line storage 64 stores the line L as numerical line segment data. The line segment data stored in the line storage 64 is data of a plurality of line segments which are sequentially connected to each other, for example, and is composed of three-dimensional coordinates indicating a start point and an end point of each line segment. The line segment data stored in the line storage 64 may further include data for identifying the line shape, indicating, for example, whether the line segment is a straight line or a curve, or the like.

The operation command generator 65 is operable to generate operation commands for operating the parallel link mechanism 1 and the linear motion mechanism 31, on the basis of the line segment data of the line L stored in the line storage 64. The operation command generator 65 includes an area division unit 67, a straight area operation command generation unit 68, and a corner area operation command unit 69.

The area division unit 67 is operable to divide the line L on the flat work surface S into a straight area LS and a corner area LC using a boundary surface B as a reference, in accordance with a predetermined rule. The straight area operation command generation unit 68 is operable to generate a command for operating only the linear motion mechanism 31 while keeping the posture of the parallel link mechanism 1 fixed, in the straight area LS. The corner area operation command generation unit 69 is operable to generate a command so that an acting point P of the end effector 29 passes on the boundary surface B at a substantially constant speed through coordinate operations of the linear motion mechanism 31 and the parallel link mechanism 1 in the corner area LC.

The area division unit 67 may calculate the size of the corner area LC on the basis of, as the above rule, the speed limit of the linear motion mechanism 31 and the movement speed of the linear motion mechanism 31 calculated from each divided passing point F and a target movement speed specified by the corner area operation command generation unit 69, for example. Thus, it is possible to calculate an appropriate size of the corner area LC that allows desired coordinated operations to be performed. Alternatively, the area division unit 67 may have a table TB indicating the relationship between the size of the corner area LC and a specified target movement speed, and may calculate the size of the corner area LC from the target movement speed, using the table TB.

The corner area operation command generation unit 69 divides a path from a start point A to an end point E of the corner area LC into a specified number of sections by passing points F, for example. The corner area operation command generation unit 69 calculates movement amounts X, Y, Z of the linear motion mechanism 31 in each divided section, and movement amounts $\beta1$, $\beta2$, $\beta3$ of the actuators 53 to 55 composing the parallel link mechanism 1. Furthermore, the corner area operation command generation unit 69 calculates movement speeds of the actuators 35 to 37, 53 to 55 in each section, on the basis of a movement period in each section determined by the specified target movement speed and the distance of the section, and the movement amounts $\beta1$, $\beta2$, $\beta3$, X, Y, Z of the actuators 53 to 55, 35 to 37 in the section. The corner area operation command generation unit 69 generates a command for continuously positioning each actuator 35 to 37, 53 to 55 without acceleration or deceleration, in each divided section.

Further details of the functions of the area division unit 67, the straight area operation command generation unit 68, and the corner area operation command generation unit 69 will be described together with a specific example of the control method below.

<Operation of Control Device 61>

Figure 4:
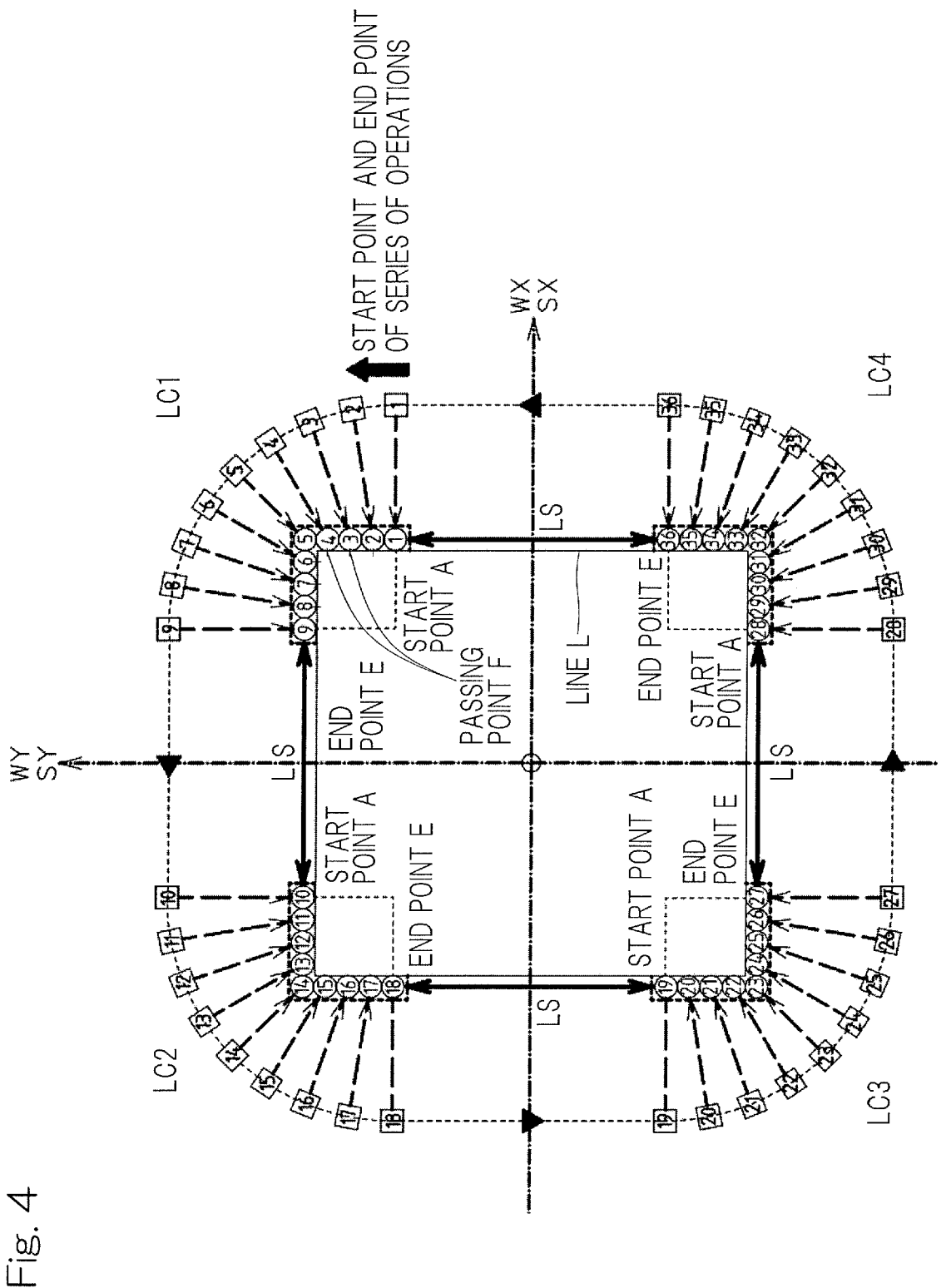
FIG. 4 is a plan view showing areas of the target workpiece.

The case where the target workpiece W is a rectangular parallelepiped and the end effector 29 is caused to act on the outer peripheral side surface of the target workpiece W, will be shown as an example. FIG. 4 shows a schematic diagram of the structure shown in FIG. 2, as seen from above. The outer peripheral line L on the side surface of the rectangular parallelepiped on which the end effector 29 acts, is divided into straight areas LS and corner areas LC (LC1 to LC4), and in each corner area LC, the path from a start point A to an end point E of the corner area LC is divided into a plurality of sections by passing points F. A circle plot enclosing a number represents coordinates (workpiece coordinates: WX, WY, WZ) at which the end effector 29 acts, in an orthogonal coordinate system of the target workpiece W, and a quadrangle plot enclosing a number represents coordinates (stage coordinates: SX, SY) where the XY stage 34 moves, in an orthogonal coordinate system of the XY stage 34. Here, the workpiece coordinate system and the stage coordinate system have origins at the same position.

Since the parallel link mechanism 1 is mounted on the XY stage 34, an arrow from the quadrangle plot to the circle plot represents the direction in which the end effector 29 acts on the target workpiece W. The numbers in the circle plots and the quadrangle plots represent the order in which each actuator is positioned through a series of operations. The trajectory of the XY stage 34 is set to be a trajectory having an arc so that the XY stage 34 moves smoothly.

The operation command generator 65 calculates, for each section, the movement amounts β1, β2, β3 of the actuators 53, 54, 55 composing the parallel link mechanism 1 and the movement amounts (X, Y, Z) for the respective axes of the linear motion mechanism 31 at the time of movement in each divided section of the corner area LC. The relationship between the movement amounts in a three-dimensional orthogonal coordinate system (XYZ plane coordinate system) and the movement amounts β1, β2, β3 of the actuators 53 to 55 of the parallel link mechanism 1, will be described later. The operation command generator 65 calculates, for each section, the movement amounts β1, β2, β3 and the movement speed for each axis of the linear motion mechanism 31 so that the end effector 29 passes around the side surface of the target workpiece W at a specified speed. The calculation method will be described later.

For example, in the case where a point A at which the operation is started is a start point A of the corner area LC1, the series of operations is as follows. First, the linear motion mechanism 31 (XY stage 34, work table 39) and the parallel link mechanism 1 are moved so that the end effector 29 indicates the start point A of the corner area LC1. Then, the end effector 29 is activated, and at the same time, the actuators 53 to 55, 35 to 37 are continuously positioned without acceleration or deceleration, in each section by the movement amounts (β1, β2, β3, X, Y, Z) and the speeds calculated in advance, until reaching the end point E of the corner area LC1.

After movement to the end point E of the corner area LC1 is completed, only the X axis of the linear motion mechanism 31 is moved to a start point A of the corner area LC2 while the posture of the parallel link mechanism 1 remains as it is. Here, at the joint between the corner area LC and the straight area LS, the actuators 53 to 55, 35 to 37 are continuously operated without acceleration or deceleration. Hereafter, the same operation as described above is repeated in the corner area LC2, the corner area LC3, and then the corner area LC4. When the action of the end effector 29 is completed to reach the start point A of the corner area LC1, the end effector 29 is stopped.

Here, the distance from the start point A (circle plot 1) of the corner area LC to the corner edge (circle plot 5), and the distance from the corner edge to the corner end point E (circle plot 9), are defined as "corner length". The area division unit 67 calculates an optimum corner area LC by the following method. Here, the trajectory of the XY stage 34 in the corner area LC is set to be an arc (quadrangle plots 1 to 9) which passes from the start point A to the end point E of the corner area LC and has a center at the intersection of a line extending from the start point A of the corner area LC in the direction perpendicular to the workpiece side surface, and a line extending from the end point E of the corner area LC in the direction perpendicular to the workpiece side surface. The distance between the parallel link mechanism 1 and a target point P (see FIG. 2) is set to be an optimum distance that allows the end effector 29 to act on the target point.

Figure 5:
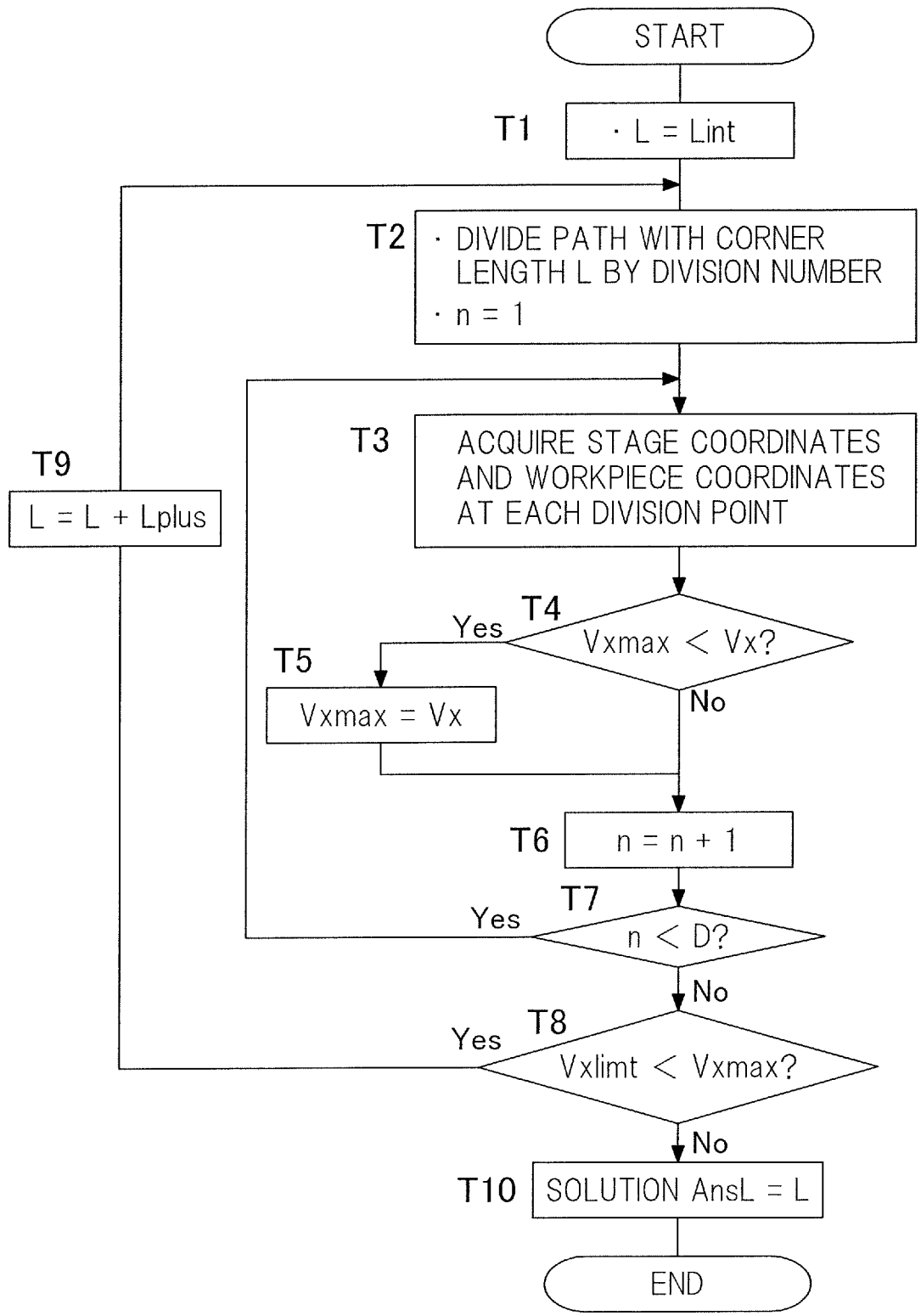
FIG. 5 is a flowchart of calculation of a corner length by the control device for the link actuation device.

If the corner length is short, the movement speed of the XY stage 34 might be excessively high at each corner, leading to occurrence of vibration at the corner. Therefore, through the procedure in the flowchart shown in FIG. 5, the corner area operation command generation unit 69 calculates an optimum corner length L. In calculation for the corner length L, the corner area operation command generation unit 69 defines the minimum corner length for reference, as Lint (step T1), and divides a path from the start point A to the end point E of the corner area LC with the corner length Lint, into a plurality of sections by passing points F (step 2). Here, the number of the divisions is defined as D, and D is a value provided as a calculation parameter in advance.

In step T1, the orthogonal coordinates at the n-th point (n: natural number) on the target workpiece W among the division points are defined as (WXn, WYn), and the workpiece orthogonal coordinates at the (n+1)-th point are defined as (WXn+1, WYn+1). Similarly, the orthogonal coordinates at the n-th point for the stage among the division points are defined as (SXn, SYn), and the stage orthogonal coordinates at the (n+1)-th point are defined as (SXn+1, SYn+1). The corner area operation command generation unit 69 calculates, for each section, movement amounts (SX, SY, WX, WY, WZ) of the stage coordinates and the workpiece coordinates, and on the basis of these calculated values and the specified target movement speed, calculates movement speeds of the X stage 33 and a Y stage (Y-axis direction of XY stage 34) at each point. In addition, the corner area operation command generation unit 69 sets Vmax to 0 in step T1, and sets n to 1 in step T2.

In step T3, the corner area operation command generation unit 69 acquires the stage coordinates and the workpiece coordinates at each division point. Then, the corner area operation command generation unit 69 calculates a movement speed Vx of the X stage 33 by the following expression (7). The corner area operation command generation unit 69 calculates Vx for all the divided sections, and sets the maximum one of the calculated values Vx, as Vxmax (step T4 to T7).

[Math 1]

$$\Delta SX = SX_{n+1} - SX_n \quad (7)$$
$$\Delta WX = WX_{n+1} - WX_n$$
$$\Delta WY = WY_{n+1} - Wy_n$$
$$\Delta WZ = WZ_{n+1} - WZ_n$$
$$Vx = \frac{\Delta SX^2}{\sqrt{\Delta WX^2 + \Delta WY^2 + \Delta WZ^2}} \times Vset$$

Specifically, the corner area operation command generation unit 69 compares the movement speed Vx of the X stage 33 calculated in step T3, with the maximum value Vxmax of the movement speed Vx of the X stage 33 (step T4). Then, if the movement speed Vx is greater than the maximum value Vxmax (Yes in step T4), the maximum value Vmax is set to Vx (step T5). Then, the corner area operation command generation unit 69 increments n to n+1 (step T6). If the movement speed Vx is equal to or smaller than the maximum value Vxmax (No in step T4), the corner area operation command generation unit 69 proceeds to step T6.

Then, the corner area operation command generation unit 69 compares n with the number D of the divisions (step T7). If the number D of the divisions is greater than n (Yes in step T7), the process returns to step T3. If n is equal to or greater than the number D of the divisions (No in step T7), the process proceeds to step T8.

Thereafter, the corner area operation command generation unit 69 compares Vxmax with a speed limit Vxlmt of the X stage 33 which is provided as a calculation parameter in advance (step T8). If Vxmax is greater than Vxlmt (Yes in step T8), that is, if the movement speed of the X stage 33 is greater than the speed limit of the X stage 33, the corner length L is set as L=L+Lplus (step T9), and the process returns to step 12, to divide again the path from the start point A to the end point E of the corner area LC with the corner length L, into a plurality of sections by passing points F. Lplus is an addition amount for the corner length, which is provided as a calculation parameter in advance. Hereafter, the same calculation as described above is performed, and then, the value of L when Vxmax becomes equal to or smaller than Vxlmt (No in step T8) is set as a final corner length Lx (step T10).

Also for the speed in the Y-axis direction of the XY stage 34, the corner area operation command generation unit 69 performs calculation in the same manner as in the case of X stage 33, to calculate a final corner length Ly. Then, the corner area operation command generation unit 69 compares Lx and Ly, and sets the greater one as a final corner length L.

The above configuration allows the acting point P of the end effector 29 to move at a substantially constant speed in operation in which the end effector 29 continuously acts on the boundary surface B having a sharp angle on the flat work surface S, whereby unevenness in working by the end effector 29 can be eliminated. In the case where, as the end effector 29, a laser, a dispenser, an ink jet device, a welding device, or the like is attached to the link to perform working, it is possible to eliminate unevenness of laser processing, unevenness of coating by the dispenser or the ink jet device, or unevenness of welding by the welding device.

The area division unit 67 makes division into the straight area LS and the corner area LC, and coordinated operations are performed in only the corner area LC. Therefore, a command for performing the coordinated operations can be generated efficiently and in a short time. In the straight area LS, of the parallel link mechanism 1 and the linear motion mechanism 31, only the linear motion mechanism 31 is operated, and therefore, it is possible to perform operation at high speed. Also, since the posture of the end effector 29 is not changed, there is an advantage in terms of working quality.

Figure 6:
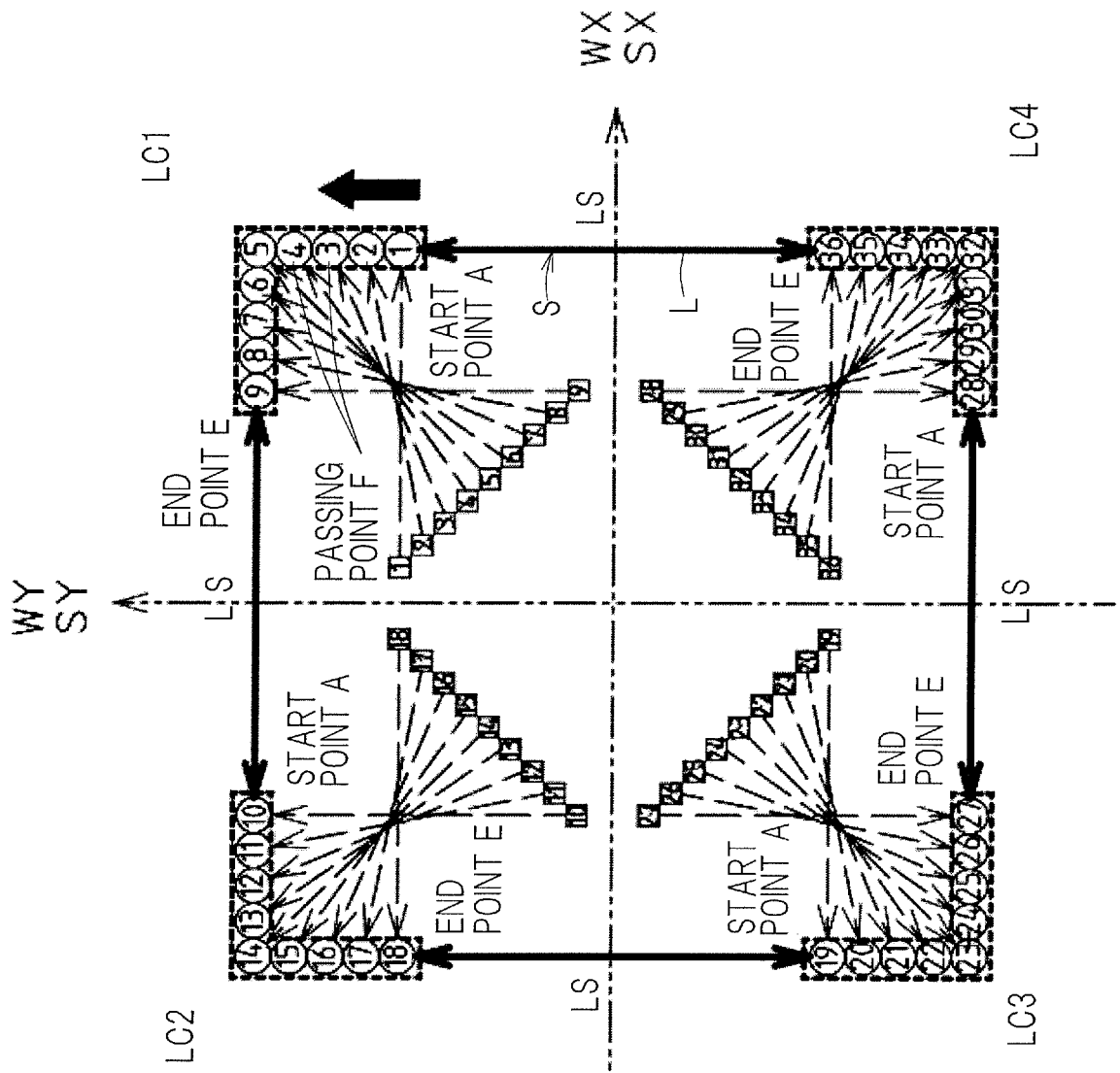
FIG. 6 is a plan view showing areas of a target workpiece in another example.

FIG. 6 shows an example in which the end effector 29 is caused to act on the inner peripheral side surface of the rectangular parallelepiped, as the flat work surface S of the target workpiece W. FIG. 6 is a schematic view of the structure shown in FIG. 2, as seen from above. As in the case of the outer periphery shown in FIG. 4, the area division unit 67 divides the inner peripheral line L on the rectangular parallelepiped into straight areas LS and corner areas LC (LC1 to LC4), and in each corner area LC, the corner area operation command generation unit 69 divides the path from a start point A to an end point E of the corner area LC into a plurality of sections by passing points F.

The coordinate positions on each axis of the linear motion mechanism 31 for each division point is determined as follows, for example. The positions of the linear motion mechanism 31 at the start point A (circle plot 1) and the end point E (circle plot 9) are located at positions (quadrangle plot 1, quadrangle plot 9) present on lines perpendicular to the side surface of the workpiece and extending in the directions in which the end effector 29 indicates the start point A and the end point E from the inner side. The position of the linear motion mechanism 31 (XY stage 34) at the corner edge point (circle plot 5) is located at a position (quadrangle plot 5) present on a bisector of the corner angle in the direction in which the end effector 29 indicates the corner edge point from the inner side. The distance between the parallel link mechanism 1 and each divided target point is set to be an optimum distance that allows the end effector 29 to act on the target point.

The positions of the linear motion mechanism 31 (XY stage 34) at points other than the start point A, the corner edge point (point on boundary surface B), and the end point E, are set on lines connecting the positions (quadrangle plot 1, quadrangle plot 5, quadrangle plot 9) of the linear motion mechanism 31 (XY stage 34) at the start point A, the corner edge point, and the end point E. Each circle plot represents the coordinates (workpiece coordinates: WX, WY, WZ) at which the end effector 29 acts, in an orthogonal coordinate system of the workpiece, and each quadrangle plot represents coordinates (stage coordinates: SX, SY) where the XY stage 34 moves, in an orthogonal coordinate system of the linear motion mechanism 31. Here, the workpiece coordinate system and the stage coordinate system have origins at the same position. An arrow from the quadrangle plot to the circle plot represents the direction in which the end effector 29 acts on the target workpiece. The numbers in the circle plots and the quadrangle plots represent the order in which each actuator is positioned through a series of operations. The series of operations and the corner length are the same as in the case of the outer peripheral side surface of the rectangular parallelepiped described with reference to FIG. 4.

Also in the case where the work surface S of the target workpiece W is the inner peripheral side surface of the rectangular parallelepiped as described above, as in the case of the outer peripheral surface, the end effector 29 can perform working on the boundary surface B having a sharp angle on the surface of the target workpiece W, while moving at a substantially constant speed at the boundary surface B, and thus can perform working without generating unevenness on the boundary surface B.

Figure 12:
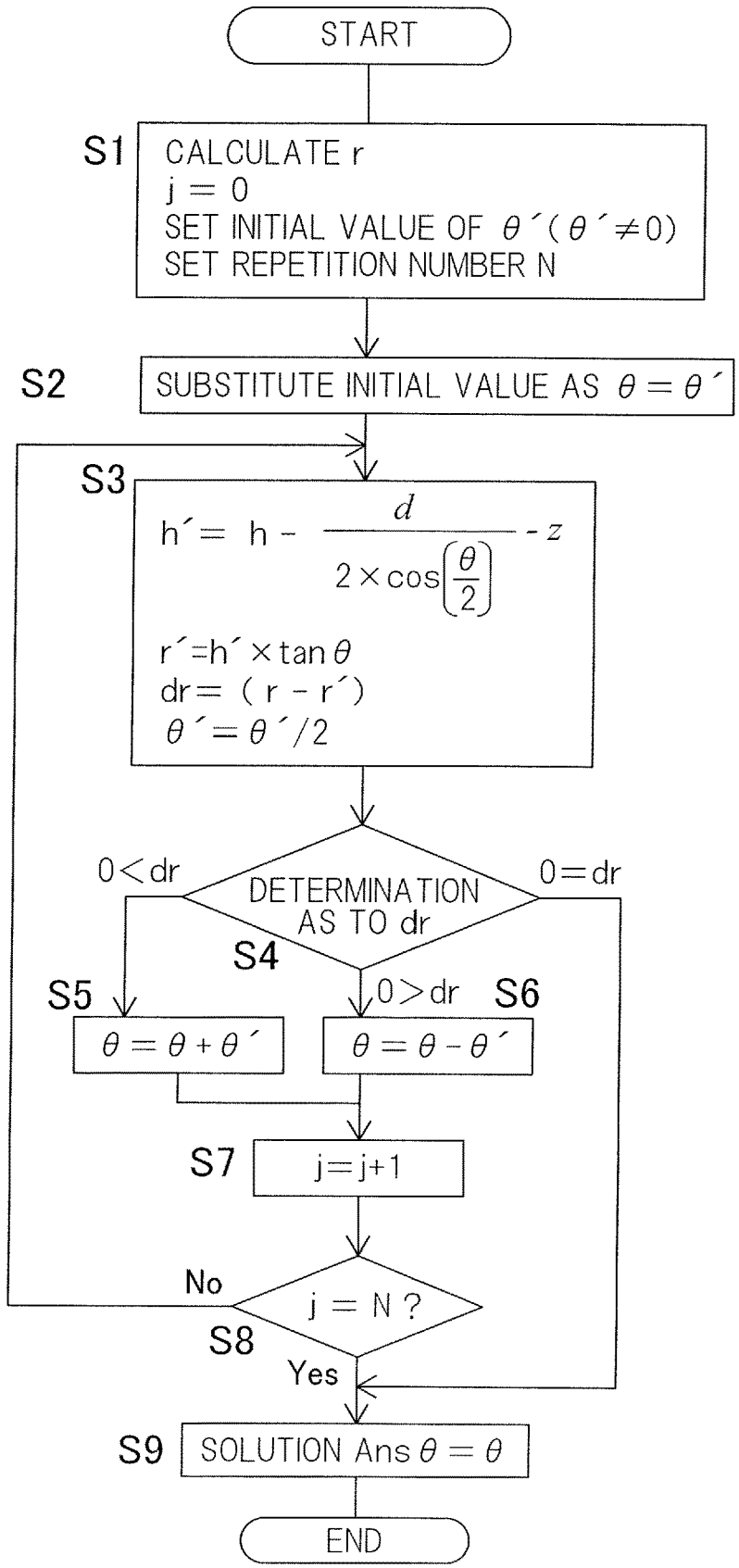
FIG. 12 is a calculation flowchart for obtaining the posture of a distal-end-side link hub (bend angle $\theta$, turning angle $\varphi$) on the basis of three-dimensional orthogonal coordinates.

The relationship between the movement amounts in a three-dimensional orthogonal coordinate system (XYZ plane coordinate system) and the movement amounts β1, β2, β3 of the actuators 53 to 55 of the parallel link mechanism 1, will be described. FIG. 12 shows a calculation flowchart and calculation formulas for calculating the posture (bend angle θ, turning angle φ) of the distal-end-side link hub 3 on the basis of three-dimensional orthogonal coordinates (XYZ plane coordinates). The calculation in this flowchart is performed through convergence calculation by the method of least squares.

As shown in the following expression (1), where the distance between target coordinates T (x, y, z) and an origin O' of a plane at a height Z is denoted by r, r is calculated from the x, y coordinates of the target coordinates T.

[Math 2]

$$r = \sqrt{x^2 + y^2} \quad (1)$$

Where the distance between the link spherical surface centers is denoted by d, the height from a reference plane to the proximal-end-side link spherical surface center is denoted by h, and the height of the target coordinates T is denoted by z, a height h' (see FIG. 13) from the rotation center of the proximal-end-side link hub 2 to the target coordinates T is represented by expression (2).

[Math 3]

$$h' = \left(h - \frac{d}{2 \times \cos\left(\frac{\theta}{2}\right)} - z\right) \quad (2)$$

Here, d and h are fixed values determined by link dimensions and device dimensions. Using the above expression (2), the distance between O' and the target coordinates T is calculated as r' by an expression relevant to θ as shown by expression (3). Therefore, the bend angle θ is obtained by searching for the bend θ that minimizes the difference between r (calculated from x, y of target coordinates T) and r' (calculated from bend angle θ) as shown in expression (4).

[Math 4]

$$r' = h' \times \tan \theta \quad (3)$$

$$dr = (r - r') \quad (4)$$

Using the above expressions, the value of θ that minimizes dr is searched for.

The range of θ is 0° to less than 90°, and the maximum angle varies depending on the specifications of the link.

The calculation flowchart shown in FIG. 12 will be described.

First, r is calculated from expression (1) (step S1). Secondly, as initial setting for the calculation process, the present repetition number j is reset to zero, and an initial set value θ' for searching for the bend angle θ, and a searching repetition number N, are set. For example, θ' is set to be half the maximum bend angle. As the repetition number N increases, accuracy of the bend angle θ finally obtained increases, but the processing tune for the calculation is prolonged. An optimum value of N is determined on the basis of the relationship between accuracy of the bend angle θ and the acceptable processing time.

Then, with θ set as θ=θ', h', r', and dr are calculated by expression (1) (step S2).

In addition, here, θ' is set as θ'=θ'/2 (step S3).

Thereafter, in step S4, determination as to dr is performed. If 0<dr is satisfied, θ is set as θ=θ+θ' (step S5). If 0>dr is satisfied, θ is set as θ=θ−θ' (step S6). Subsequently, j is incremented as j=j+1 (step S7). If 0=dr is satisfied, a solution Ansθ is set as θ=θ (step S9).

In step S8, if the present repetition number j has not reached the set repetition number N yet, the process returns to step S3. This processing flow is repeated until the repetition number N is reached, and the finally obtained Ansθ is the calculated bend angle θ. After the bend angle is calculated, the turning angle is calculated as shown in expressions (5) and (6).

[Math 5]

If $\theta = 0, \phi = 0$ (5)

If $\theta \neq 0, \pi = \tan^{-1}\left(\frac{y}{x}\right)$ (6)

From the bend angle θ and the turning angle φ calculated as described above, a target distal end posture is determined. As described above, calculating the bend angle θ by performing search in order from the neighborhood of the present coordinate position as a reference through convergence calculation by the method of least squares, leads to decrease in the number of times of calculations.

Figure 13:
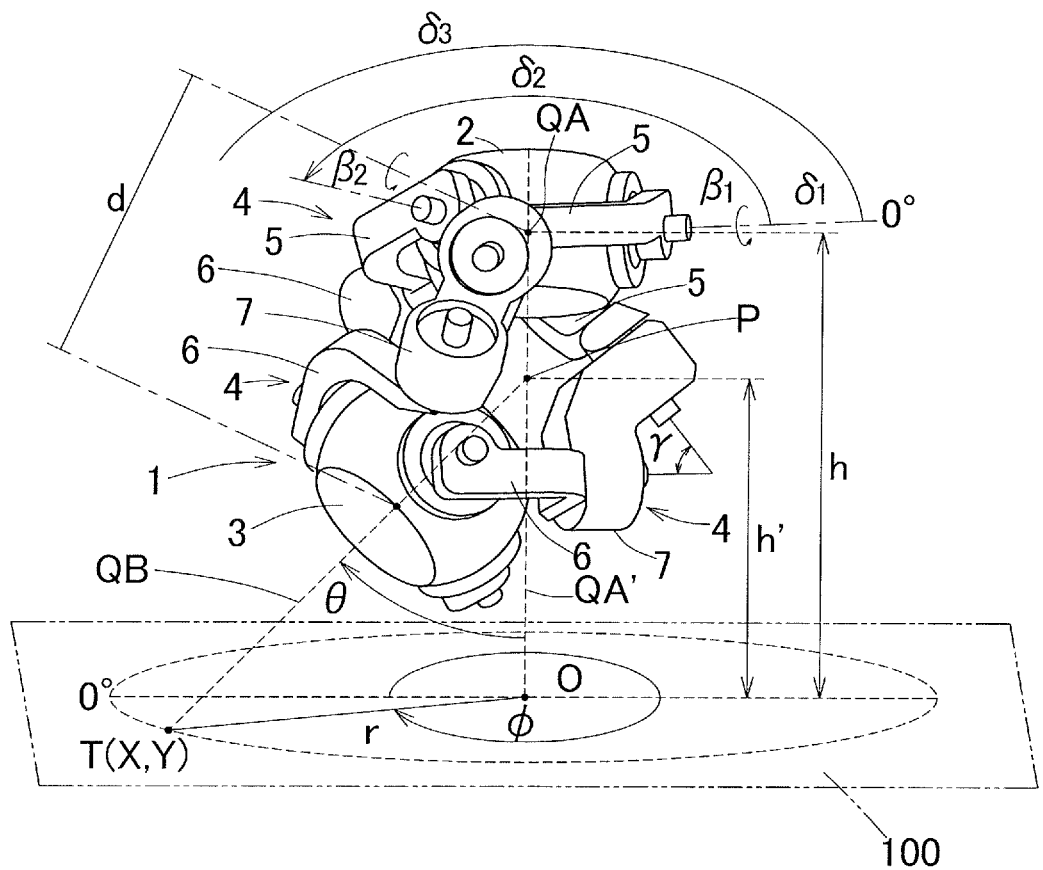
FIG. 13 is a perspective view of the parallel link mechanism shown in FIG. 7, with other dimension lines provided thereto.

From the bend angle θ and the turning angle φ calculated as described above, a movement amount (hereinafter, referred to as "rotation angle") βn (n: 1 to 3) for operating each actuator 53 to 55 of the parallel link mechanism 1 can be calculated as follows. The rotation angle βn is shown in FIG. 13 which shows the same parallel link mechanism 1 as that shown in FIG. 7, and several values necessary for the description are shown therein. The rotation angle βn is calculated by reversely converting the following expression (8), for example. The reverse conversion refers to conversion in which the rotation angle βn is calculated from the bend angle θ and the turning angle φ. The bend angle θ and the turning angle φ are mutually related with the rotation angle βn, and therefore, one value can be derived from the other values.

$$\cos(\theta/2)\sin \beta n - \sin(\theta/2)\sin(\varphi+\delta n)\cos \beta n + \sin(\gamma/2) = 0 \quad (8)$$

where n=1, 2, 3.

Here, γ is the angle between the connection end axis of the center link member 7 rotatably connected to the proximal-end-side end link member 5, and the connection end axis of the center link member 7 rotatably connected to the distal-end-side end link member 6. In addition, δn is a circumferential-direction separation angle of each proximal-end-side end link member 5 relative to the proximal-end-side end link member 5 as a reference.

It is noted that the rotation angle βn may be calculated by reversely converting expression (8) when necessary, or a table (not shown) indicating the relationship between the distal end position posture and the rotation angle βn may be prepared in advance.

The movement speed will be described.

Figure 14:
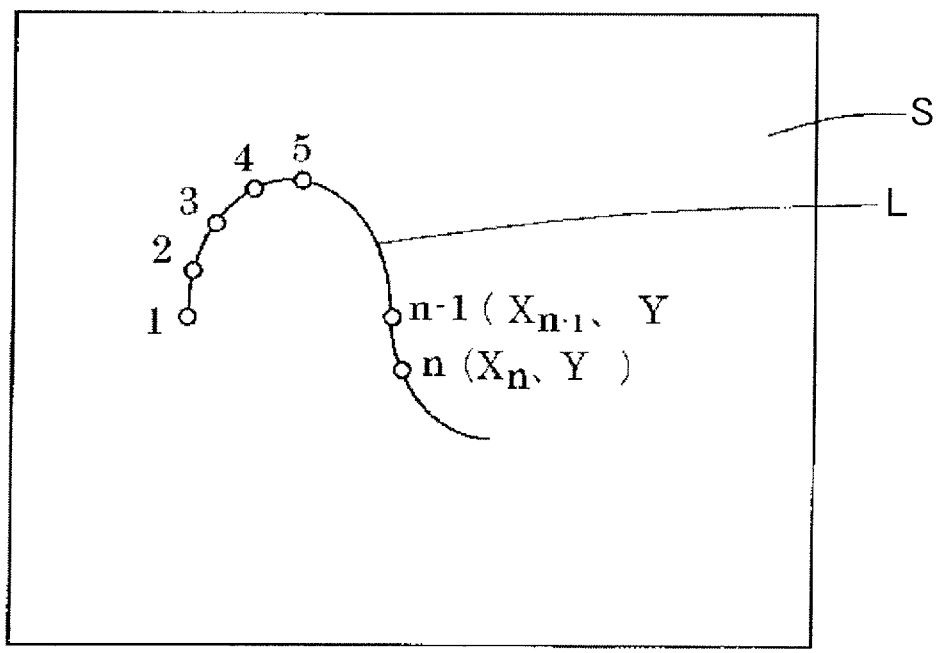
FIG. 14 illustrates the case of performing operation in a point-to-point manner on the flat work surface.
Figure 15:
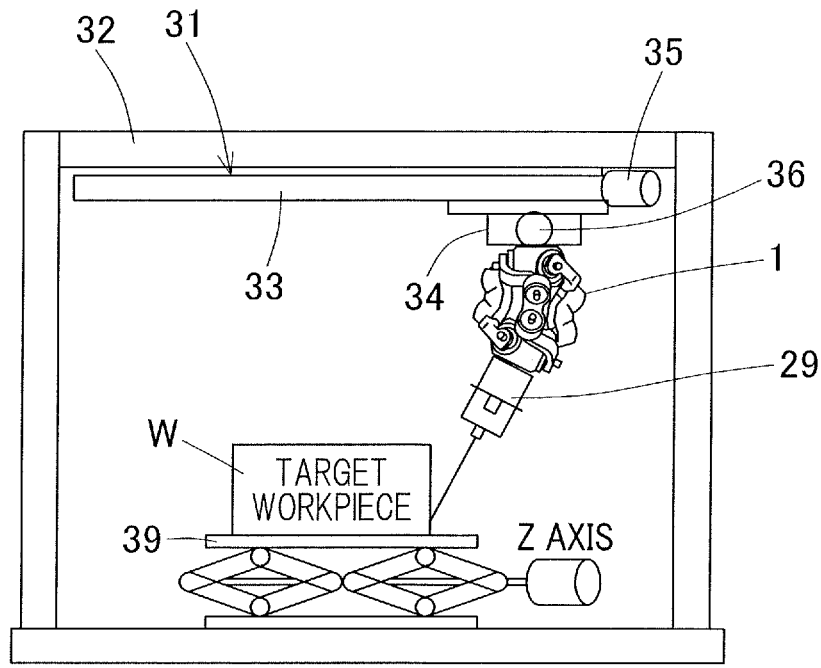
FIG. 15 is a front view of a link actuation device.
Figure 16:
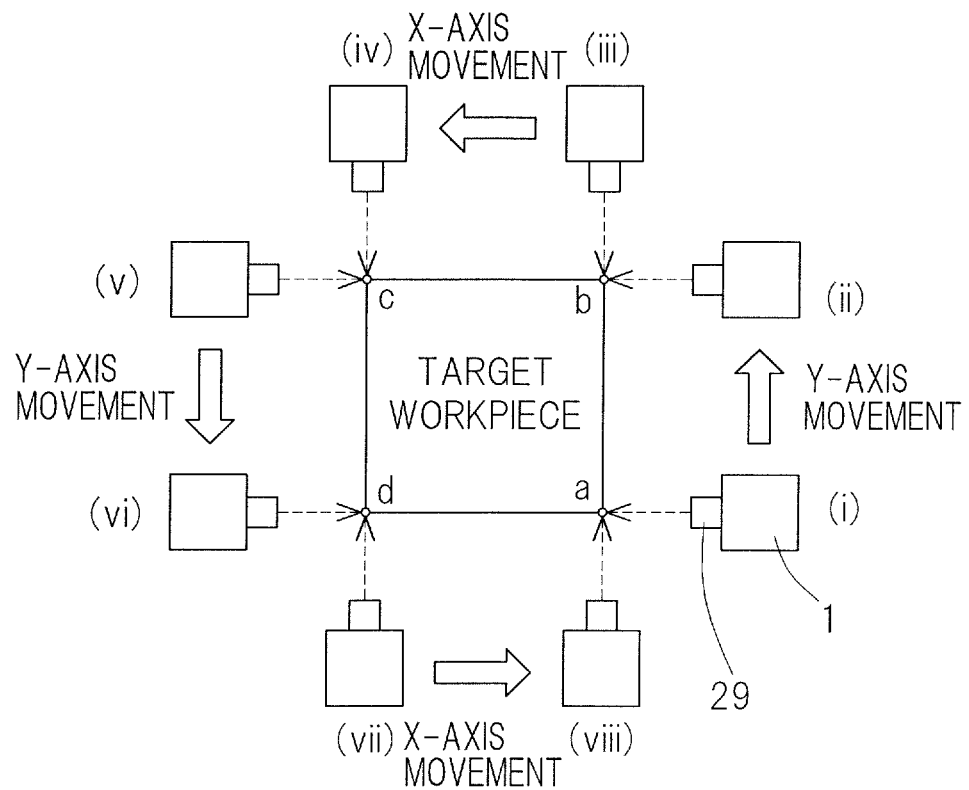
FIG. 16 illustrates operation in a conventional link actuation device.

The movement speed of the parallel link mechanism 1 alone will be described. For the purpose of simplification, the description will be given using a plan view shown in FIG. 14. As shown in FIG. 14, in the operation in which the end effector 29 traces the points on the flat work surface S at a specified target movement speed V, the orthogonal coordinates at the n-th point are defined as (Xn, Yn), the orthogonal coordinates at the (n−1)-th point are defined as (Xn−1, Yn−1), and the movement amounts on β1 axis, β2 axis, and β3 axis from the (n−1)-th point to the n-th point are defined as Δβ1, Δβ2, Δβ3. Then, movement speeds V1n, V2n, V3n on the respective axes at the time of moving to the n-th point are represented by the following expression.

[Math 6]

$$V1_n = \frac{|\triangle \beta 1|}{T}$$

$$V2_n = \frac{|\triangle \beta 2|}{T}$$

$$V3_n = \frac{|\triangle \beta 3|}{T}$$

$$T = \frac{\sqrt{(X_n - X_{n-1})^2 + (Y_n - Y_{n-1})^2}}{V}$$

In the case of combining the three axes (β1 axis, β2 axis, β3 axis) of the parallel link mechanism 1, and the linear motion mechanism 31, a combined speed Vn" when the end effector 29 moves along the points on the flat work surface S at a constant speed of V specified, will be described. Here, it is assumed that there is no movement in the Z-axis direction. As in the case of FIG. 14, regarding the orthogonal coordinates of the target workpiece W, the orthogonal coordinates at the n-th point are defined as (Xn, Yn), and the orthogonal coordinates at the (n−1)-th point are defined as (Xn−1, Yn−1). Where the movement amounts on β1 axis, β2 axis, β3 axis, X axis, and Y axis from the (n−1)-th point to the n-th point are defined as Δβ1, Δβ2, Δβ3, Δx, and Δy, respectively, movement speeds V1n", V2n", V3n", Vxn", and Vyn" on the respective axes at the time of moving to the n-th point are represented by the following expression. The movement speeds on β1 axis, β2 axis, and β3 axis are movement speeds of the rotation angles.

[Math 7]

$$V1_n'' = \frac{|\Delta \beta 1|}{T}$$

$$V2_n'' = \frac{|\Delta \beta 2|}{T}$$

$$V3_n'' = \frac{|\Delta \beta 3|}{T}$$

$$V_{xn}'' = \frac{|\Delta x|}{T}$$

$$V_{yn}'' = \frac{|\Delta y|}{T}$$

$$T = \frac{\sqrt{(X_n - X_{n-1})^2 + (Y_n - Y_{n-1})^2}}{V}$$

As described above, the control device 61 and the control method for the link actuation device according to the present embodiment allow the end effector 29 to perform working on the boundary surface B having a sharp angle on the surface of the target workpiece W, while moving at a substantially constant speed at the boundary surface B, and thus make it possible to perform working without generating unevenness on the boundary surface B.

Although the embodiments for carrying out the present invention have been described, the embodiments disclosed herein are illustrative in all aspects and not restrictive. The scope of the present invention is indicated by the claims, rather than by the above description, and is intended to include any modifications within the scope and meaning equivalent to the claims.

REFERENCE NUMERALS

1 . . . parallel link mechanism
2 . . . proximal-end-side link hub
3 . . . distal-end-side link hub
4 . . . link mechanism
29 . . . end effector
31 . . . linear motion mechanism
32 . . . mount
33 . . . X stage
34 . . . XY stage
35 to 37 . . . actuator
39 . . . work table
41 . . . link actuation device
53 to 55 . . . actuator
61 . . . control device
66 . . . controller
67 . . . area division unit
68 . . . straight area operation command generation unit
69 . . . corner area operation command unit
70 . . . operation command storage
L . . . line
S . . . flat work surface
W . . . target workpiece

What is claimed is:

1. A control device for a link actuation device, the control device controlling the link actuation device in which a parallel link mechanism and a linear motion mechanism are combined and which performs working by causing an end effector to continuously act along a line extending over a boundary surface at a corner on a flat work surface of a target workpiece, the parallel link mechanism having a structure in which a distal-end-side link hub, to which the end effector is mounted, is connected to a proximal-end-side link hub via three or more link mechanisms such that a posture of the distal-end-side link hub is changeable relative to the proximal-end-side link hub, and the parallel link mechanism including a plurality of actuators for changing the posture of the distal-end-side link hub, the linear motion mechanism having a function of linearly moving in two-axis directions or three-axis directions orthogonal to each other by being driven by actuators, and the linear motion mechanism being provided so as to move the proximal-end-side link hub of the parallel link mechanism or move the target workpiece, the control device comprising:
a line storage configured to store the line as line segment data;
an operation command generator configured to generate an operation command for operating the parallel link mechanism and the linear motion mechanism, on the basis of the stored line; and
a controller configured to control the actuators of the linear motion mechanism and the parallel link mechanism in accordance with the generated operation command, wherein
the operation command generator includes:
an area division unit configured to divide the line on the flat work surface into a straight area and a corner area, using the boundary surface as a reference, in accordance with a predetermined rule;
a straight area operation command generation unit configured to generate a command for operating only the linear motion mechanism while keeping the posture of the parallel link mechanism fixed, in the straight area; and
a corner area operation command generation unit configured to generate a command so that an acting point of the end effector passes on the boundary surface at a substantially constant speed by the linear motion mechanism and the parallel link mechanism performing coordinated operations in the corner area.

2. The control device for the link actuation device as claimed in claim 1, wherein the corner area operation command generation unit is configured to:
to divide a path from a start point to an end point of the corner area into a specified number of sections by passing points;
to calculate a movement amount of each actuator composing the parallel link mechanism and a movement amount of the linear motion mechanism in each divided section;
to calculate a movement speed of each actuator in each section on the basis of the movement amount of the actuator of the section and a movement period in the section determined by a specified target movement speed and a distance of the section; and to generate the command so as to continuously position each actuator without acceleration or deceleration, in each divided section.

3. The control device for the link actuation device as claimed in claim 2, wherein the area division unit calculates a size of the corner area, on the basis of a speed limit of the linear motion mechanism and a movement speed of the linear motion mechanism calculated from each divided passing point and the specified target movement speed in the corner area operation command generation unit.

4. The control device for the link actuation device as claimed in claim 2, wherein the area division unit includes a table indicating a relationship between a size of the corner area and a specified target movement speed, and calculates the size of the corner area from the target movement speed by using the table.

5. The control device for the link actuation device as claimed in claim 2, wherein the operation command generator calculates settings for all the sections in the corner area before the link actuation device actually operates, and stores the settings into an operation command storage, and the controller performs control by reading the settings corresponding to the sections from the operation command storage, at a time of operating the link actuation device.

6. The control device for the link actuation device as claimed in claim 1, wherein the flat work surface to be worked by the end effector is an outer peripheral surface of a rectangular parallelepiped.

7. The control device for the link actuation device as claimed in claim 1, wherein the flat work surface to be worked by the end effector is an inner peripheral surface of a rectangular parallelepiped.

8. A control method for a link actuation device, the control method controlling the link actuation device in which a parallel link mechanism and a linear motion mechanism are combined and which performs working by causing an end effector to continuously act along a line extending over a boundary surface at a corner on a flat work surface of a target workpiece, the parallel link mechanism having a structure in which a distal-end-side link hub, to which the end effector is mounted, is connected to a proximal-end-side link hub via three or more link mechanisms such that a posture of the distal-end-side link hub is changeable relative to the proximal-end-side link hub, and the parallel link mechanism including a plurality of actuators for changing the posture of the distal-end-side link hub, the linear motion mechanism having a function of linearly moving in two-axis directions or three-axis directions orthogonal to each other by being driven by actuators, and the linear motion mechanism being provided so as to move the proximal-end-side link hub of the parallel link mechanism or move the target workpiece, the control method comprising:

dividing the line on the flat work surface into a straight area and a corner area, using the boundary surface as a reference, in accordance with a predetermined rule;

operating only the linear motion mechanism while keeping the posture of the parallel link mechanism fixed, in the straight area; and performing operation so that an acting point of the end effector passes on the boundary surface at a substantially constant speed by the linear motion mechanism and the parallel link mechanism performing coordinated operations in the corner area.

9. The control method for the link actuation device as claimed in claim 8, further comprising:

storing the line as line segment data;

generating an operation command for operating the parallel link mechanism and the linear motion mechanism, on the basis of the stored line; and controlling the actuators of the linear motion mechanism and the parallel link mechanism in accordance with the generated operation command.

\* \* \* \* \*